US008271111B2

(12) United States Patent
Makino

(10) Patent No.: US 8,271,111 B2
(45) Date of Patent: Sep. 18, 2012

(54) DEVICE AND METHOD FOR MUSIC PLAYBACK, AND RECORDING MEDIUM THEREFOR

(75) Inventor: Masaaki Makino, Kanagawa-ken (JP)

(73) Assignee: JVC Kenwood Corporation, Kanagawa (JP)

( * ) Notice: Subject to any disclaimer, the term of this patent is extended or adjusted under 35 U.S.C. 154(b) by 1156 days.

(21) Appl. No.: 11/898,845

(22) Filed: Sep. 17, 2007

(65) Prior Publication Data

US 2008/0066611 A1 Mar. 20, 2008

(30) Foreign Application Priority Data

Sep. 20, 2006 (JP) ................................ P2006-253996
Mar. 16, 2007 (JP) ................................ P2007-068919

(51) Int. Cl.
*G06F 17/00* (2006.01)
(52) U.S. Cl. ........................................ 700/94; 715/706
(58) Field of Classification Search .................... 700/94; 715/706
See application file for complete search history.

(56) References Cited

U.S. PATENT DOCUMENTS 6,140,565 A * 10/2000 Yamauchi et al. .............. 84/600
6,452,609 B1 * 9/2002 Katinsky et al. .............. 715/716
6,731,307 B1 * 5/2004 Strubbe et al. ................ 715/727
6,938,209 B2 * 8/2005 Ogawa et al. ................. 715/727
7,381,973 B2 * 6/2008 Olstowski .................. 250/461.1
7,650,570 B2 * 1/2010 Torrens et al. ................ 715/727
7,849,420 B1 * 12/2010 Amidon et al. ............... 715/848
7,908,554 B1 * 3/2011 Blattner ........................ 715/706
2006/0262116 A1 * 11/2006 Moshiri et al. ................ 345/419
2008/0250315 A1 * 10/2008 Eronen et al. ................. 715/706
2010/0018382 A1 * 1/2010 Feeney et al. ................... 84/615

FOREIGN PATENT DOCUMENTS

JP 09-034909 2/1997
JP 3067199 U 12/1999
JP 2001-052009 A 2/2001
JP 2003-150293 A 5/2003
JP 2003-242164 8/2003
JP 2005-202453 A 7/2005
JP 2006-079198 A 3/2006
JP 2006-285895 A 10/2006
WO 02/48917 A1 6/2002

OTHER PUBLICATIONS

ID3v2 informal standard: Copyright Mar. 26, 1998.*
Official Action in the counterpart Japanese application, JP 2007-068919, issued on Dec. 6, 2011, two pages.

* cited by examiner

*Primary Examiner* — Paul McCord
(74) *Attorney, Agent, or Firm* — The Nath Law Group; Jerald L. Meyer; Stanley N. Protigal

(57) ABSTRACT

When a main category change command is received, a main category change section refers to a category information storage section to change setting from a main category under current setting to another main category according to a predetermined order. After completing the main category change processing, a sub category change section refers to the category information storage section to select one sub category from among sub categories belonging to the newly set main category by use of random numbers. An image data generation section reads displayed information corresponding to the set main category and corresponding to the set sub category from a main-category expression-information storage section and a sub-category expression-information storage section, and generates image data according to the read displayed information.

16 Claims, 29 Drawing Sheets

FIG. 3

| MAIN CATEGORY NAME | SUB CATEGORY 1 | SUB CATEGORY 2 | ... |
|---|---|---|---|
| HEALING TYPE | QUIET | CALM | ... |
| POWERFUL TYPE | HARD | STRONG | ... |
| ⋮ | ⋮ | ⋮ | ... |

FIG. 4

| MAIN CATEGORY NAME | SUB CATEGORY 1 | SUB CATEGORY 2 | SUB CATEGORY 3 | ... |
|---|---|---|---|---|
| JAZZ | WEST COAST | BOP | BIG BAND | ... |
| CLASSICAL MUSIC | BAROQUE | CLASSIC SCHOOL | IMPRESSIONIST SCHOOL | ... |
| ⋮ | ⋮ | ⋮ | ⋮ | ... |

FIG. 5

| MAIN CATEGORY NAME | SUB CATEGORY 1 | SUB CATEGORY 2 | ... |
|---|---|---|---|
| JAPANESE WOMAN | SATANA AKA | YARAWA HAMA | ... |
| MAN GUITARIST | ABC | DEF | ... |
| ⋮ | ⋮ | ⋮ | ⋮ |

FIG. 6
| MAIN CATEGORY NAME | CHARACTERS |
|---|---|
| HEALING TYPE | 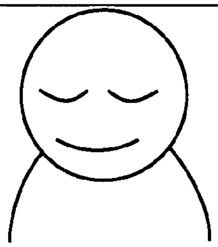 |
| POWERFUL TYPE |  |
| ⋮ | ⋮ |
FIG. 7
| MAIN CATEGORY NAME | COLOR INFORMATION |
|---|---|
| HEALING TYPE | GREEN |
| POWERFUL TYPE | RED |
| ⋮ | ⋮ |

FIG. 8

| MAIN CATEGORY NAME | BASIC SHAPE | BASIC SPEED (pixel/sec) | MOVEMENT | ... |
|---|---|---|---|---|
| HEALING TYPE | BALL | 20 | FALLING DOWN WHILE SWAYING | ... |
| POWERFUL TYPE | STAR | 50 | BOUNCING OFF | ... |
| ⋮ | ⋮ | ⋮ | ⋮ | ... |

FIG. 9

| SUB CATEGORY NAME | DISPLAY INFORMATION |
|---|---|
| QUIET | QUIET-MUSIC PICKED OUT |
| CALM | CALM-MUSIC PICKED OUT |
| HARD | ENJOY HARD-MUSIC ! |
| ⋮ | ⋮ |

FIG. 10
| SUB CATEGORY NAME | DECORATIVE ITEMS |
|---|---|
| QUIET | 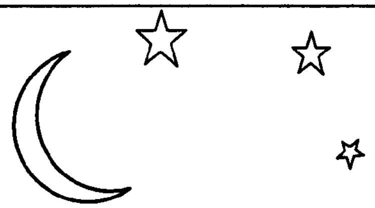 |
| CALM |  |
| ⋮ | ⋮ |
FIG. 11
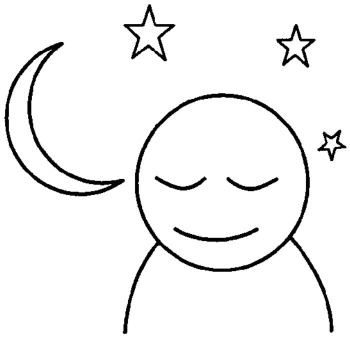

FIG. 12

| SUB CATEGORY NAME | OBJECT COLORS |
|---|---|
| QUIET | BLUE |
| CALM | GREEN |
| ⋮ | ⋮ |

FIG. 13

| CONTENT ID | CORRESPONDING SUB CATEGORY |
|---|---|
| CONTENT ID 1 | CALM |
| CONTENT ID 2 | QUIET |
| ⋮ | ⋮ |

FIG. 19

| ORDER | MAIN CATEGORY NAME |
|---|---|
| 1 | MAIN CATEGORY 1 |
| 2 | MAIN CATEGORY 2 |
| 3 | MAIN CATEGORY 3 |

FIG. 20

| MAIN CATEGORY NAME | SUB CATEGORY NAME | ORDER |
|---|---|---|
| MAIN CATEGORY 1 | SUB CATEGORY A | 1 |
| | SUB CATEGORY B | 2 |
| | SUB CATEGORY C | 3 |
| MAIN CATEGORY 2 | SUB CATEGORY D | 1 |
| ⋮ | ⋮ | ⋮ |

FIG. 28
| MAIN CATEGORY NAME | MAIN-CATEGORY NUMBER-OF-PLAYBACK-TIMES | SUB CATEGORY NAME | SUB-CATEGORY NUMBER-OF-PLAYBACK-TIMES |
|---|---|---|---|
| HEALING TYPE | 30 | QUIET | 10 |
| | | CALM | 5 |
| | | ⋮ | ⋮ |
| POWERFUL TYPE | 100 | STRONG | 30 |
| ⋮ | ⋮ | ⋮ | ⋮ |
FIG. 29
| NUMBER OF PLAYBACK TIMES / MAIN CATEGORY NAME | 0~100 | 101~200 | … |
|---|---|---|---|
| HEALING TYPE | 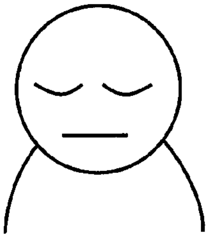 | 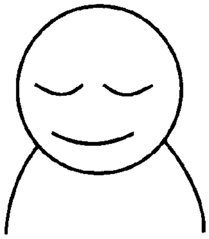 | … |
| POWERFUL TYPE |  |  | … |
| ⋮ | ⋮ | ⋮ | ⋱ |

FIG. 30
| SUB CATEGORY NAME \ NUMBER OF PLAYBACK TIMES | 0~100 | 101~200 | 201~300 | ··· |
|---|---|---|---|---|
| QUIET | LIGHT GREEN | GREEN | DEEP GREEN | ··· |
| CALM | LIGHT BLUE | BLUE | DEEP BLUE | ··· |
| ⋮ | ⋮ | ⋮ | ⋮ | ⋱ |
FIG. 31
| SUB CATEGORY NAME \ NUMBER OF PLAYBACK TIMES | 0~100 | 101~200 | 201~300 | ··· |
|---|---|---|---|---|
| QUIET | 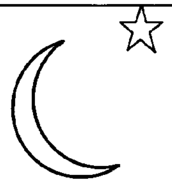 | 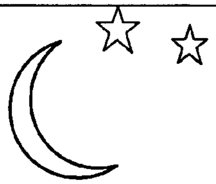 | 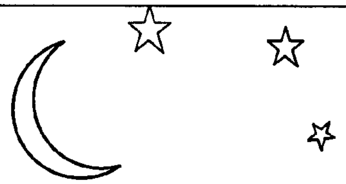 | ··· |
| CALM |  |  |  | ··· |
| ⋮ | ⋮ | ⋮ | ⋮ | ⋱ |

FIG. 35
| MAIN CATEGORY NAME | MAIN-CATEGORY NUMBER-OF-REGISTERED-PIECES | SUB CATEGORY NAME | SUB-CATEGORY NUMBER-OF-REGISTERED-TIMES |
|---|---|---|---|
| HEALING TYPE | 600 | QUIET | 200 |
| | | CALM | 250 |
| | | ⋮ | ⋮ |
| POWERFUL TYPE | 120 | STRONG | 50 |
| ⋮ | ⋮ | ⋮ | ⋮ |
FIG. 36
| MAIN CATEGORY NAME \ NUMBER OF REGISTERED PIECES | 0~500 | 501~2000 | ... |
|---|---|---|---|
| HEALING TYPE |  | 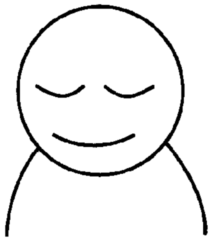 | ... |
| POWERFUL TYPE |  |  | ... |
| ⋮ | ⋮ | ⋮ | ⋱ |

FIG. 37
| SUB CATEGORY NAME \ NUMBER OF REGISTERED PIECES | 0~500 | 501~2000 | 2001~5000 | ... |
|---|---|---|---|---|
| QUIET | LIGHT GREEN | GREEN | DEEP GREEN | ... |
| CALM | LIGHT BLUE | BLUE | DEEP BLUE | ... |
| ⋮ | ⋮ | ⋮ | ⋮ | ⋱ |
FIG. 38
| SUB CATEGORY NAME \ NUMBER OF REGISTERED PIECES | 0~500 | 501~1000 | 1001~2000 | ... |
|---|---|---|---|---|
| QUIET | 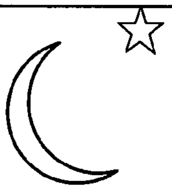 | 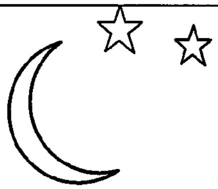 | 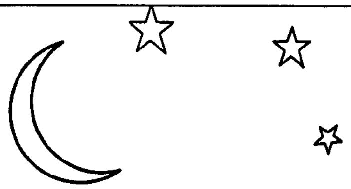 | ... |
| CALM |  |  |  | ... |
| ⋮ | ⋮ | ⋮ | ⋮ | ⋱ |

FIG. 42
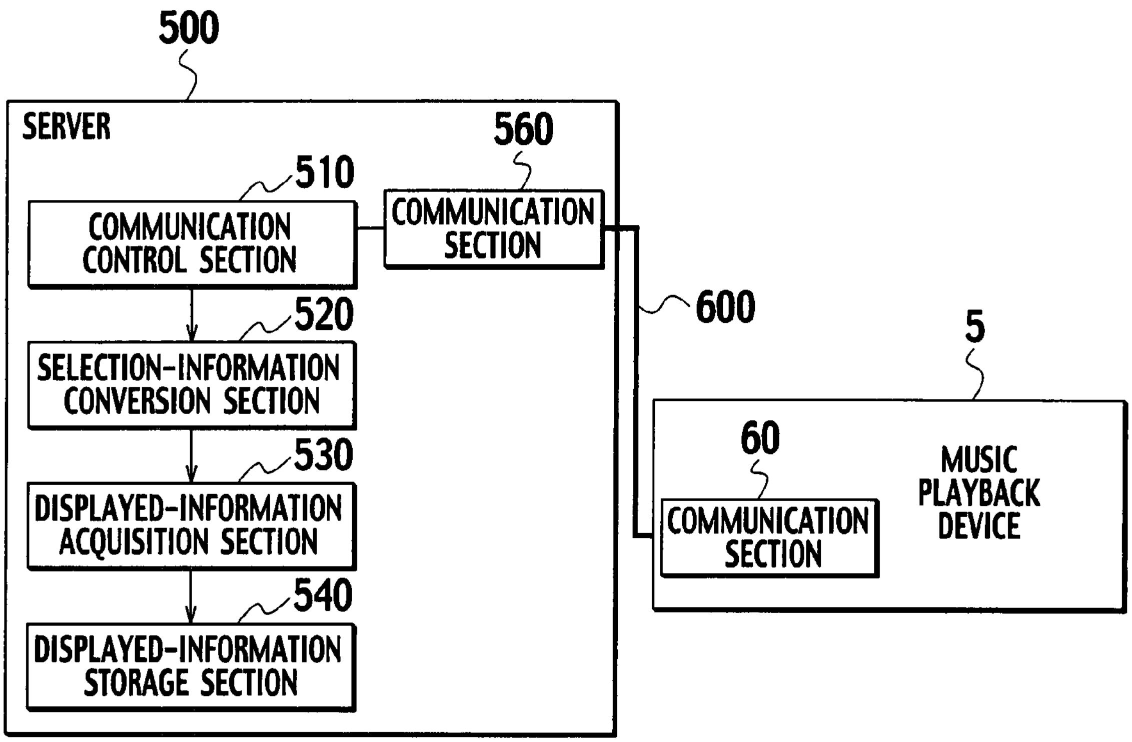
FIG. 43
| DISPLAYED INFORMATION ID | DISPLAYED INFORMATION SET |
|---|---|
| ID1 | 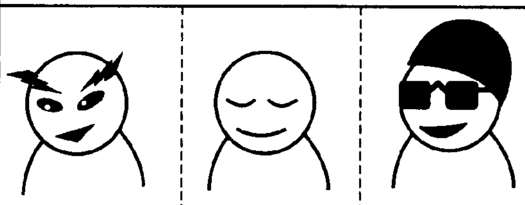 |
| ID2 | 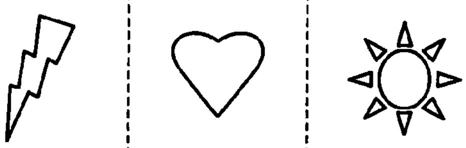 |
| ⋮ | ⋮ |

DEVICE AND METHOD FOR MUSIC PLAYBACK, AND RECORDING MEDIUM THEREFOR

BACKGROUND OF THE INVENTION

1. Technical Field

The present invention relates to a music playback device, a music playback method, and a computer-readable recording medium recording a music playback program, wherein playing music back is executed by searching through a recording medium recording music contents for desired contents of a user.

2. Related Art

Recently, a mass storage device such as an optical disk, a hard disk or a semiconductor memory has been used. One example of devices using a mass recording medium is a portable music playback device, some of which may record a large number of music data in one unit. When tens of thousands of music pieces are registered in such a music playback device, there has been caused a problem that it is difficult to search for a desired music piece of a user because it is difficult for the user to remember all the names of music pieces.

A method using the mood of music or human sensibilities, a method giving music a still picture, or a character, or the like have been proposed as a method to solve the above problem. According to, for example, Japanese Patent Application Laid-Open No. 9-034909, there has been disclosed a method in which a file having a sensibility value, which have been given by user questionnaires beforehand, is subjected to a factor analysis according to sensibility values, is converted into a position in a factor space and is plotted. Using the above factor space, an approximately desired file may be selected according to sensibility information based on an adjective-pair parameter such as "light-dark" and "clear-unclear," wherein the above parameter is input by a user.

According to Japanese Patent Application Laid-Open No. 2003-242164, there has been disclosed a method in which a still picture with a similar impression to a music sound signal is linked with the signal, based on sound feature values calculated from the signal, and a thumbnail for the still picture is displayed on a music list screen to discover a desired music on a visual and intuitive manner.

However, the method according to Japanese Patent Application Laid-Open No. 9-034909 has had a problem that a user is required to input an adjective-pair parameter with a taking-time operation. When the above sensibility input is conducted according to sensibility information on a desired file, it is difficult for a user to set the sensibility information on the file by a numerical value without neither reference nor clue.

Moreover, the method disclosed in Japanese Patent Application Laid-Open No. 2003-242164 is understood in some cases in a more intuitive manner in comparison with a case using letters, because the mood of music is expressed by using an image and a character, but have disadvantages in which a larger display device is required, and the number of music pieces which may be displayed at a time may be reduced in comparison with a case using only letters, because registered pieces are displayed as a list with a thumbnail.

SUMMARY OF THE INVENTION

The present invention has been made, considering the above-described problems, and its objective is to provide a music playback device, a music playback method, and a computer-readable recording medium for playing music back, according to which a music piece meeting with the mood of a user may be selected in a more intuitive manner and without requiring complex operations.

In order to achieve the above-described objective, there is provided a music playback device which selects one piece of music data from a first storage section storing music data for each of a plurality of music pieces, and plays the selected piece of music data in a playback section, including: a second storage section storing first corresponding information about a correspondence between one of a plurality of sub categories, which are information of music classification about the plurality of music pieces, and each piece of music data for each music piece; a third storage section storing second corresponding information about a correspondence between each of a plurality of main categories used as a high level category of the sub categories and one or more different sub categories; a fourth storage section storing main category displayed information for generating pieces of image data different for each main category, the pieces of image data being displayed on a display section; a change section setting one sub category from among the plurality of sub categories as an initial value, setting a main category corresponding to the set sub category as an initial value by referring to the second corresponding information stored in the third storage section, and when an instruction signal for changing the main category is supplied from outside, selecting and setting one main category except a main category that is currently set as a new main category, selecting and setting one sub category corresponding to the newly set main category as a new sub category with referring to the second corresponding information; a selection section reading one piece of music data corresponding to the sub category set newly in the change section from the first storage section with referring to the first corresponding information stored in the second storage section, and allowing the playback section to play back the read piece of music data; and a generation section reading the main category displayed information corresponding to the main category set newly in the change section from the fourth storage section and generating image data according to the read main category displayed information.

According to a preferable aspect of the present invention, the music playback device further includes a fifth storage section storing sub category displayed information for generating pieces of image data different for each sub category, the pieces of image data being displayed on the display section, wherein the generation section further reads the sub category displayed information corresponding to the sub category set newly in the change section from the fifth storage section, and generates image data according to the read sub category displayed information.

According to a preferable aspect of the present invention, the music playback device further includes a creation section acquiring all pieces of main category displayed information about the plurality of main categories from the fourth storage section and allowing the display section to display the acquired main category displayed information as list information, wherein the change section, when a main category selection signal representing a main category selected from among the list information is supplied, sets the selected main category as a new main category, and selects and sets one sub category corresponding to the newly set main category as a new sub category with referring to the second corresponding information stored in the third storage section.

According to a preferable aspect of the present invention, the music playback device further includes a fifth storage section storing numbers of playback times of music pieces, which are played in the playback section, for respective main categories, wherein the fourth storage section stores a plurality of pieces of main category displayed information decided according to the number of playback times for each main category, and the generation section reads the number of playback times from the fifth storage section, reads main category displayed information corresponding to the main category set newly in the change section and corresponding to the number of playback times read from the fourth storage section, and generates image data according to the read main category displayed information.

According to a preferable aspect of the present invention, the third storage section stores the second corresponding information about the correspondence between each of the plurality of main categories used as the high level category of the sub categories and the one or more sub categories, and stores the numbers of registered pieces of music data, which is stored in the first storage section, for respective main categories, the fourth storage section stores a plurality of pieces of main category displayed information decided according to the number of registered pieces for each main category, and the generation section reads the number of registered pieces corresponding to the main category set newly in the change section from the third storage section, reads main category displayed information corresponding to the main category set newly in the change section and corresponding to the number of registered pieces read from the fourth storage section, and generates the image data according to the read main category displayed information.

According to a preferable aspect of the present invention, the music playback device further includes a sixth storage section storing numbers of playback times of music pieces, which are played in the playback section, for respective sub categories, wherein the fifth storage section stores a plurality of pieces of sub category displayed information decided according to the number of playback times for each sub category, and the generation section reads the main category displayed information corresponding to the main category set newly in the change section from the fourth storage section, and reads the sub category displayed information corresponding to the sub category set newly in the change section and corresponding to the number of playback times read from the sixth storage section, from the fifth storage section, and generates the image data according to the read main category displayed information and the read sub category displayed information.

According to a preferable aspect of the present invention, the third storage section stores the second corresponding information about the correspondence between each of the plurality of main categories used as the high level category of the sub categories and the one or more sub categories, and stores the numbers of registered pieces of music data, which is stored in the first storage section, for respective sub categories, the fifth storage section stores a plurality of pieces of sub category displayed information decided according to the number of registered pieces for each sub category, and the generation section reads the number of registered pieces corresponding to the sub category set newly in the change section from the third storage section, reads main category displayed information corresponding to the main category set newly in the change section from the fourth storage section, reads sub category displayed information corresponding to the sub category set newly in the change section and corresponding to the number of registered pieces read from the fourth storage section, and generates the image data according to the read main category displayed information and the read sub category displayed information.

According to a preferable aspect of the present invention, the change section refers to the second corresponding information stored in the third storage section, and selects and sets one sub category except a sub category that is currently set, from among the plurality of sub categories corresponding to a main category that is currently set, when an instruction signal for changing a sub category is supplied from the outside.

In order to achieve the above-described objective, there is provided a music playback method by which one piece of music data is selected from a first storage section storing music data for each of a plurality of music pieces, and the selected piece of music data is played back, including: setting one sub category as an initial value from among a plurality of sub categories, which are information of music classification about the plurality of music pieces; setting a main category corresponding to the set sub category as an initial value by referring to second corresponding information stored in a third storage section storing the second corresponding information about a correspondence between each of a plurality of main categories used as a high level category of the sub categories and one or more different sub categories; selecting and reading one piece of music data corresponding to the set sub category from the first storage section by referring to first corresponding information stored in a second storage section storing the first corresponding information about a correspondence between one of the plurality of sub categories and each piece of music data for each music piece, and playing back the read piece of music data; reading main category displayed information corresponding to the set main category from a fourth storage section storing the main category displayed information for generating pieces of image data different for each main category, the pieces of image data being displayed on a display section, and generating image data according to the read main category displayed information; waiting for a signal to be supplied from outside; selecting and setting one main category except a main category that is currently set as a new main category, and selecting and setting one sub category corresponding to the newly set main category as a new subcategory with referring to the second corresponding information when an instruction signal for changing the main category is supplied from the outside; and returning to the step of selecting and reading one piece of music data, and reselecting one piece of music data for play back corresponding to the newly set sub category and regenerating the image data based on the newly set main category.

According to a preferable aspect of the present invention, the music playback method further includes reading sub category displayed information corresponding to the newly set sub category from a fifth storage section storing the sub category displayed information for generating pieces of image data different for each sub category, the pieces of image data being displayed on the display section; and generating image data according to the read sub category displayed information, in addition to generating the image data according to the displayed information corresponding to the newly set main category.

According to a preferable aspect of the present invention, the music playback method further includes acquiring all pieces of main category displayed information about the plurality of main categories from the fourth storage section and allowing the display section to display the acquired main category displayed information as list information, when a main category selection signal representing a main category selected from among the list information is supplied from the outside; and setting the selected main category as a new main category, and selecting and setting one sub category corresponding to the newly set main category as a new sub category with referring to the second corresponding information stored in the third storage section.

According to a preferable aspect of the present invention, the fourth storage section stores a plurality of pieces of main category displayed information decided according to the number of playback times for each main category, the method further includes a step of updating the number of playback times of a main category corresponding to the played music piece when the selected piece of music data is played back, the number of playback times being recorded in a fifth storage section storing the numbers of playback times of played music pieces for respective main categories, and in the step of generating the image data according to the main category displayed information corresponding to the set main category, the number of playback times is read from the fifth storage section, and main category displayed information corresponding to the set main category and corresponding to the read number of playback times is read from the fourth storage section to generate the image data according to the read main category displayed information.

According to a preferable aspect of the present invention, the third storage section stores the second corresponding information about the correspondence between each of the plurality of main categories used as the high level category of the sub categories and the one or more sub categories, and stores the numbers of registered pieces of music data, which is stored in the first storage section, for respective main categories, and the fourth storage section stores a plurality of pieces of main category displayed information decided according to the number of registered pieces for each main category, and in the step of generating the image data according to the displayed information corresponding to the set main category, the number of registered pieces corresponding to the set main category is read from the third storage section, and main category displayed information corresponding to the set main category and corresponding to the read number of registered pieces is read from the fourth storage section, and the image data is generated according to the read main category displayed information.

According to a preferable aspect of the present invention, the fifth storage section stores a plurality of pieces of sub category displayed information decided according to the number of playback times for each sub category, and in the step of generating the image data according to the displayed information corresponding to the set main category and the set sub category, the main category displayed information corresponding to the set main category is read from the fourth storage section, and the sub category displayed information corresponding to the set sub category and corresponding to a number of playback times read from a sixth storage section storing numbers of playback times of played music pieces for respective sub categories is read from the fifth storage section to generate the image data according to the read main category displayed information and the read sub category displayed information.

According to a preferable aspect of the present invention, the third storage section stores the second corresponding information about the correspondence between each of the plurality of main categories used as the high level category of the sub categories and the one or more sub categories, and stores the numbers of registered pieces of music data, which is stored in the first storage section, for respective sub categories, and the fifth storage section stores a plurality of pieces of sub category displayed information decided according to the number of registered pieces for each sub category, and in the step of generating the image data according to the displayed information corresponding to the set main category and the set sub category, the number of registered pieces corresponding to the set sub category is read from the third storage section, main category displayed information corresponding to the set main category is read from the fourth storage section, sub category displayed information corresponding to the set sub category and corresponding to the read number of registered pieces is read from the fifth storage section, and the image data is generated according to the read main category displayed information and the read sub category displayed information.

According to a preferable aspect of the present invention, the music playback method further includes referring to the second corresponding information stored in the third storage section, and selecting and setting one sub category except a sub category that is currently set, from among the plurality of sub categories corresponding to a main category that is currently set, when an instruction signal for changing a sub category is supplied from the outside.

In order to achieve the above-described objective, there is provided a computer-readable recording medium recording a program by which a computer executes a function by which one piece of music data from a first storage section storing music data for each of a plurality of music pieces is selected, and the selected piece of music data is played back, the program including: a procedure setting one sub category as an initial value from among a plurality of sub categories, which are information of music classification about the plurality of music pieces; a procedure setting a main category corresponding to the set sub category as an initial value by referring to second corresponding information stored in a third storage section storing the second corresponding information about a correspondence between each of a plurality of main categories used as a high level category of the sub categories and one or more different sub categories; a procedure selecting one piece of music data corresponding to the set sub category from the first storage section by referring to first corresponding information stored in a second storage section storing the first corresponding information about a correspondence between one of the plurality of sub categories and each piece of music data for each music piece, and playing back the read piece of music data; a procedure reading main category displayed information corresponding to the set main category from a fourth storage section storing the main category displayed information for generating pieces of image data different for each main category, the pieces of image data being displayed on a display section, and generating image data according to the read main category displayed information; a procedure waiting for a signal to be supplied from outside; a procedure selecting and setting one main category except a main category that is currently set as a new main category, and selecting and setting one sub category corresponding to the newly set main category as a new sub category with referring to the second corresponding information when an instruction signal for changing the main category is supplied from the outside; and a procedure returning to the procedure of selecting and reading one piece of music data, and reselecting one piece of music data for play back corresponding to the newly set sub category and regenerating the image data based on the newly set main category.

According to a preferable aspect of the present invention, in the procedure generating the image data according to the displayed information corresponding to the newly set main category, sub category displayed information corresponding to the newly set sub category is further read from a fifth storage section storing the sub category displayed information for generating pieces of image data different for each sub category, the pieces of image data being displayed on the display section; and image data is further generated according to the read sub category displayed information.

According to a preferable aspect of the present invention, the program further includes: a procedure acquiring all pieces of main category displayed information about the plurality of main categories from the fourth storage section and allowing the display section to display the acquired main category displayed information as list information, when a main category selection signal representing a main category selected from among the list information is supplied from the outside; and a procedure setting the selected main category as a new main category, and selecting and setting one sub category corresponding to the newly set main category as a new sub category with referring to the second corresponding information stored in the third storage section.

According to a preferable aspect of the present invention, the fourth storage section stores a plurality of pieces of main category displayed information decided according to the number of playback times for each main category, the program further includes a procedure updating the number of playback times of a main category corresponding to the played music piece when the selected piece of music data is played back, the number of playback times being recorded in a fifth storage section storing the numbers of playback times of played music pieces for respective main categories, and in the procedure generating the image data according to the main category displayed information corresponding to the set main category, the number of playback times is read from the fifth storage section, and main category displayed information corresponding to the set main category and corresponding to the read number of playback times is read from the fourth storage section to generate the image data according to the read main category displayed information.

According to a preferable aspect of the present invention, the third storage section stores the second corresponding information about the correspondence between each of the plurality of main categories used as the high level category of the sub categories and the one or more sub categories, and stores the numbers of registered pieces of music data, which is stored in the first storage section, for respective main categories, and the fourth storage section stores a plurality of pieces of main category displayed information decided according to the numbers of registered pieces for each main category, and in the procedure generating the image data according to the displayed information corresponding to the set main category, the number of registered pieces corresponding to the set main category is read from the third storage section, and main category displayed information corresponding to the set main category and corresponding to the read number of registered pieces is read from the fourth storage section, and the image data is generated according to the read main category displayed information.

According to a preferable aspect of the present invention, the fifth storage section stores a plurality of pieces of sub category displayed information decided according to the number of playback times for each sub category, and in the procedure generating the image data according to the displayed information corresponding to the set main category and the set sub category, the main category displayed information corresponding to the set main category is read from the fourth storage section, and the sub category displayed information corresponding to the set sub category and corresponding to a number of playback times read from a sixth storage section storing numbers of playback times of played music pieces for respective sub categories is read from the fifth storage section to generate the image data according to the read main category displayed information and the read sub category displayed information.

According to a preferable aspect of the present invention, the third storage section stores the second corresponding information about the correspondence between each of the plurality of main categories used as the high level category of the sub categories and the one or more sub categories, and stores the numbers of registered pieces of music data, which is stored in the first storage section, for respective sub categories, and the fifth storage section stores a plurality of pieces of sub category displayed information decided according to the number of registered pieces for each sub category, and in the procedure generating the image data according to the displayed information corresponding to the set main category and the set sub category, the number of registered pieces corresponding to the set sub category is read from the third storage section, main category displayed information corresponding to the set main category is read from the fourth storage section, sub category displayed information corresponding to the set sub category and corresponding to the read number of registered pieces is read from the fifth storage section, and the image data is generated according to the read main category displayed information and the read sub category displayed information.

According to a preferable aspect of the present invention, the program further including: a procedure referring to the second corresponding information stored in the third storage section, and selecting and setting one sub category except a sub category that is currently set, from among the plurality of sub categories corresponding to a main category that is currently set, when an instruction signal for changing a sub category is supplied from the outside.

According to the music playback device, the music playback method, and the computer-readable recording medium of the present invention, the context of a currently selected music piece may be intuitively understood by expressing classification information on music pieces in terms of characters, colors, animations, and the like.

Especially, a two layered structure including main categories and sub categories is provided, and music pieces are classified into sub categories while characters, colors, animations, and the like, which are displayed on a screen, are changed according to main categories, so that the kind of the characters, that of the colors, that of the animations, and the like, which are displayed on a screen, are not so increased in comparison with a case in which one layer structure including only one category is provided. For this reason, a user may enjoy excellent viewability and operability.

Moreover, even when a user vaguely feels like saying that the user eagerly wants to listen to some kind of music pieces, but cannot specify preferable one, it is comparatively easy in many cases to judge with reference to a music piece under playback whether it is "completely different from my present mood", or "a little bit different from my present mood". According to the present invention, a subsequent music piece for playback is decided, based on user's response to the above reference music piece under playback, and, furthermore, the response to the reference music piece is continuously accepted. Accordingly, it is easy for the user to search a desired music piece through a series of interactions even when the user does not perceive exactly what kind of music he or she wants to listen to.

Moreover, when specifying a mood of a music piece for playback, a user has to operate by use of only information displayed on a screen according to a conventional method. On the other hand, according to the present invention, a user may operate a music playback device based on not only information displayed on a screen thereof but also an impression of a music piece the user currently listens to.

Accordingly, the user may easily reach a favorable music piece. Moreover, as an amount of information which is required to be displayed on a screen is reduced, the present invention may be conveniently applied to a gadget with a small-sized display device such as a cellular telephone, a portable player, and an on-board device.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a view showing one example of a category information storage section according to the first and the second embodiments of the present invention;

FIG. 4 is a view showing a category information storage section according to the first and the second embodiments of the present invention;

FIG. 5 is a view showing a category information storage section according to the first and the second embodiments of the present invention;

FIG. 6 is a view showing a main-category expression-information storage section according to the first and the second embodiments of the present invention;

FIG. 7 is a view showing a main-category expression-information storage section according to the first and the second embodiments of the present invention;

FIG. 8 is a view showing a main-category expression-information storage section according to the first and the second embodiments of the present invention;

FIG. 9 is a view showing a sub-category expression-information storage section according to the first and the second embodiments of the present invention;

FIG. 10 is a view showing a sub-category expression-information storage section according to the first and the second embodiments of the present invention;

FIG. 11 is a view showing an image data combining a main-category expression-information storage section according to the first and the second embodiments of the present invention and a sub-category expression-information storage section according to the first and the second embodiments of the present invention;

FIG. 12 is a view showing a sub-category expression-information storage section according to the first and the second embodiments of the present invention;

FIG. 13 is a view showing a music information storage section according to the first and the second embodiments of the present invention;

FIG. 19 is a view showing one example in which main categories are serially numbered, wherein the main categories are stored in a category information storage section according to the first and the second embodiments of the present invention;

FIG. 20 is a view showing one example in which sub categories are serially numbered, wherein the sub categories are stored in a category information storage section according to the first and the second embodiments of the present invention;

FIG. 28 is a view showing one example of a number-of-playback-time storage section according to the third embodiment of the present invention;

FIG. 29 is a view showing one example of a main-category expression-information storage section according to the third embodiment of the present invention;

FIG. 30 is a view showing one example of a main-category expression-information storage section according to the third embodiment of the present invention;

FIG. 31 is a view showing one example of a sub-category expression-information storage section according to the third embodiment of the present invention;

FIG. 35 is a view showing one example of a category information storage section according to the fourth embodiment of the present invention;

FIG. 36 is a view showing one example of a main-category expression-information storage section according to the fourth embodiment of the present invention;

FIG. 37 is a view showing one example of a main-category expression-information storage section according to the fourth embodiment of the present invention;

FIG. 38 is a view showing one example of a sub-category expression-information storage section according to the fourth embodiment of the present invention;

FIG. 42 is a view showing a state in which the music searching device 5 and a server according to the fifth embodiment of the present invention are connected to each other through a network;

FIG. 43 is a view showing one example of an expression-information storage section in the server according to the fifth embodiment of the present invention;

DESCRIPTION OF THE PREFERRED EMBODIMENTS

Hereinafter, preferred embodiments for carrying out the present invention will be explained in detail, referring to drawings.

First Embodiment

Figure 1:
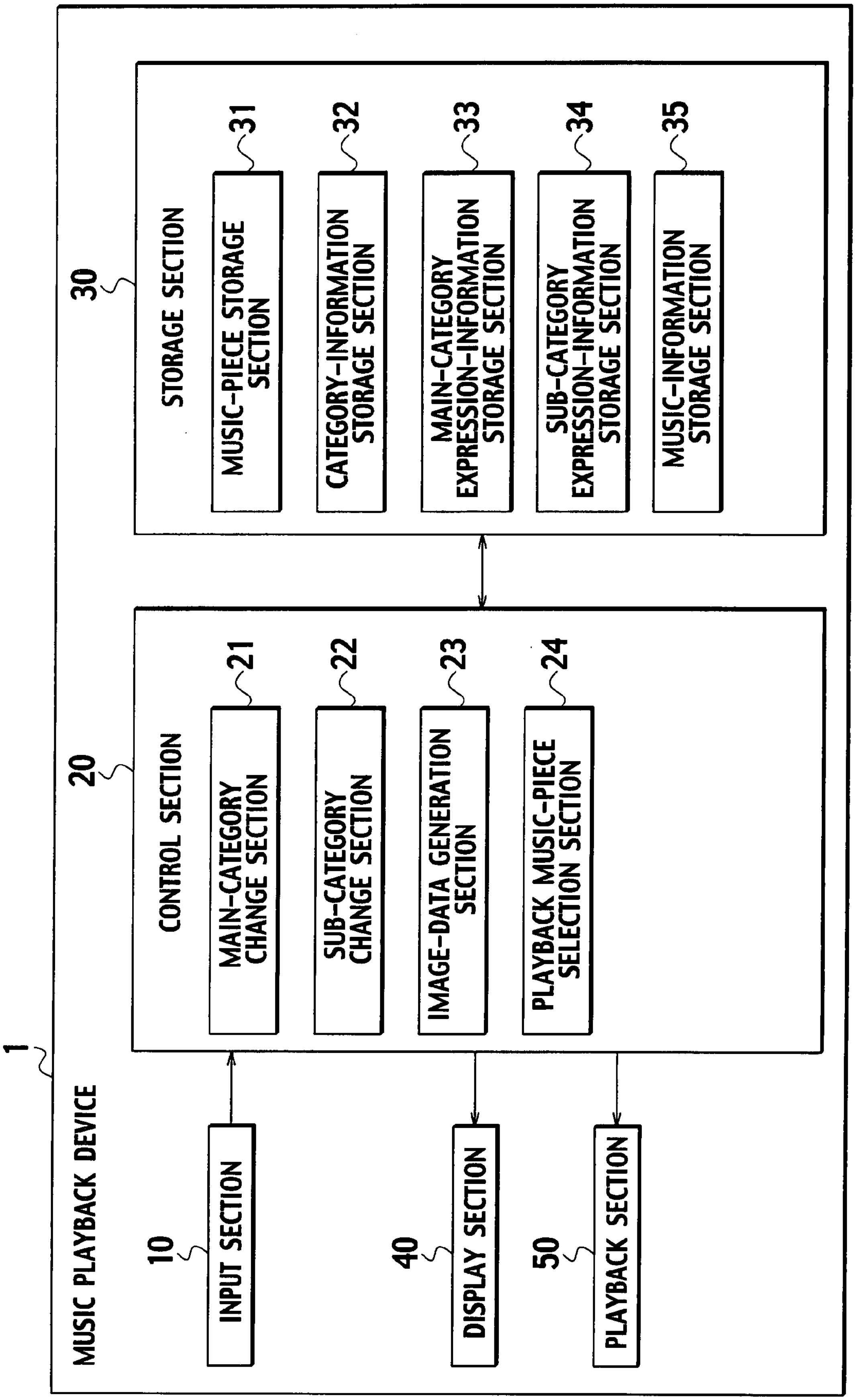
FIG. 1 is a block diagram showing a music playback device 1 according to a first embodiment of the present invention.

The configuration of a music playback device 1, shown in FIG. 1, according to a first embodiment of the present invention will be explained.

The music playback device 1 according to the present embodiment accepts operations of a user, using a currently-playing music piece as a judgement reference, searches through music pieces stored in a recording medium and the like for a music piece desired by a user, and plays the searched one. Moreover, the feature of the device 1 is a configuration in which music pieces are classified into categories with a two layered structure, the context of a category is expressed by a character, a color, and an animation to make classification information more easily understandable in an intuitive manner.

The music playback device 1 according to the present embodiment is configured to include: an input section 10; a control section 20; a storage section 30; a display section 40; and a playback section 50. The control section 20 is provided with: a main category change section 21; a sub category change section 22; an image data generation section 23; and a playback music-piece selection section 24. Moreover, the storage section 30 is provided with: a music piece storage section 31; a category information storage section 32; a main-category expression-information storage section 33; a sub-category expression-information storage section 34; and a music information storage section 35.

Figure 2A:
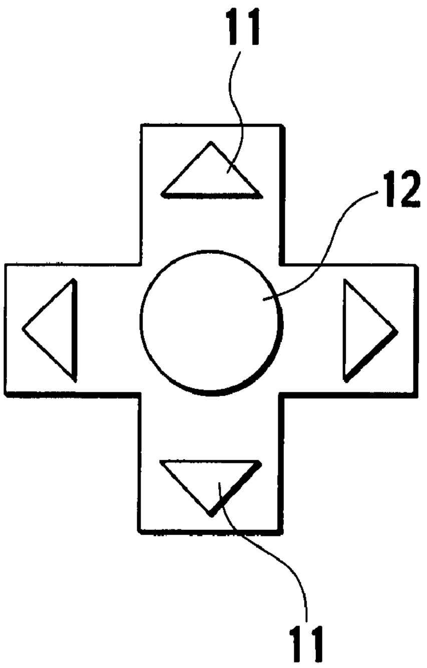
FIG. 2A is a view of an input section 10 according to the first embodiment of the present invention.
Figure 2B:
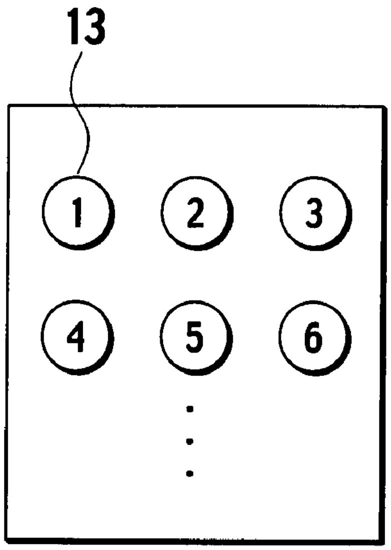
FIG. 2B is a view of an input section 10 according to a second embodiment of the present invention.

The input section 10 is a device by which a user inputs various kinds of information, and, for example, is a directional pad, and a touch panel, which may be used for a remote control unit and a mobile terminal, in addition to a mouse and a keyboard. FIG. 2A and FIG. 2B show one example of the input section 10. FIG. 2A is a schematic view of a directional pad comprising: four cursor move buttons 11 for four directions, and a decision button 12. Then, FIG. 2B is a schematic view of numeric keys comprising direct input buttons 13.

The control section 20 will be explained. The control section 20 provided with a CPU and memories (not shown) controls the whole part of the music playback device 1 when the CPU executes programs for searching for and play back music pieces, wherein the programs are expanded on the memories. Subsequently, the control section 20 will be explained according to respective functions thereof.

The main category change section 21 has a function to change a main category. The main category is a high level category of the above-described categories with the two-layered structure. The details will be explained when the category information storage section 32 is described later.

The sub category change section 22 has a function to change a sub category. A sub category belongs to a certain main category. The details will be explained when the category information storage section 32 is described later.

The image data generation section 23 creates information to be displayed (displayed information), based on a current category setting and music information under current playback, to update a screen. The displayed information created above is displayed by the display section 40.

The playback music-piece selection section 24 selects a music piece belonging to a subcategory under current setting. The music piece selected above is played back by the playback section 50.

Then, the storage section 30 will be explained. The storage section 30 has a mass recording medium such as a hard disk and a nonvolatile memory wherein the medium has a high-speed access capability. Then, the storage section 30 will be explained according to respective functions thereof.

The music piece storage section 31 stores digital data of music pieces. Each of the digital data is identified with its content ID.

The category information storage section 32 stores main category settings and sub category ones. As described above, a main category has one or more sub categories as a component. Variations of main categories, those of sub categories, and those of sub categories belonging to each main category are set by a designer beforehand. A main category is segmented into sub categories.

FIG. 3 shows one example of a category configuration. In FIG. 3, sub categories forming a main category of "healing type" include "calm," and "quiet," and sub categories forming a main category of a "powerful type" include "hard," and "strong". Moreover, the main category of "healing type" is segmented into the sub categories of "calm" and "quiet."

Besides the sensibility expression such as "healing type" and "calm," which have been described in the example shown in FIG. 3, it is acceptable to use bibliographical information such as a genre and an artist. FIG. 4 shows one example in which settings using the genre are stored in the category information storage section 32. In the example shown in FIG. 4, the context of a category is assumed to be a genre, and, as a component of a main category of "jazz," subcategories are set to "West Coast," "bop," and "big band". FIG. 5 shows one example in which settings using the artist are stored in the category information storage section 32. In the example shown in FIG. 5, as a component of a main category of "Japanese woman," sub categories are set to "Satana AKA," and "Yarawa HAMA."

The main-category expression-information storage section 33 stores displayed information by which there are different kinds of displays on the screen of the display section 40 for each of main categories. In the present invention, the main category is not expressed by a category name (for example, "healing type") using characters, but is represented by a character, a color, an animation, and the like. FIG. 6 shows one example of the main-category expression-information storage section 33. In the example of FIG. 6, the context representing a category is expressed by use of characters. For example, a setting in the case of "healing type" uses a character with a relaxed mood, and a setting in the case of "powerful type" uses a character with a strong mood. When a character is used as displayed information for a main category, it is acceptable to use bit map image data, or vector image data as data stored in the main-category expression-information storage section 33.

Moreover, the main-category expression-information storage section 33 stores color information in FIG. 7. In the example shown in FIG. 7, colors for a background on a screen, and the like are stored. Then, green is set when a main category is "healing type," and red is set when the category is "powerful type."

In FIG. 8, animation information is stored in the main-category expression-information storage section 33. The example of FIG. 8 shows a state in which a shape of an animation object, an animation speed, and the movement of the animation object are stored. When a main category is "healing type," there is set a configuration in which the shape is "ball," the animation speed is 20 pixels per second, and the movement is falling down while swaying.

Here, displayed information such as the character, the color, the animation and the like for the main category, which have been described, may be separately used, or combinations thereof may be also used.

The sub-category expression-information storage section 34 stores displayed information for a sub category. Specifically, the sub-category expression-information storage section 34 also stores displayed information such as letter information, decorative items decorating the displayed information in the main-category expression-information storage section 33, and detailed rules for animations.

FIG. 9 shows an example in which letter information is stored in the sub-category expression-information storage section 34. An example in FIG. 9 shows a state in which lines indicated by a character is stored in the sub-category expression-information storage section 34. When a sub category is "quiet," displayed information of "quiet music picked out" is stored, and, in the case of "calm," displayed information of "calm music picked out" is done.

FIG. 10 shows an example in which the decorative items are stored in the sub-category expression-information storage section 34. The example in FIG. 10 shows a state in which, assuming that a character is registered in the main-category expression-information storage section 33, decorative items for the character is stored in the sub-category expression-information storage section 34. FIG. 11 shows one example in which the character information in FIG. 7 and the decorative items in FIG. 10 are combined when a sub category is "quiet."

One example in which detailed regulations for animations are stored in the sub-category expression-information storage section 34 is shown in FIG. 12. In the example shown in FIG. 12, color information on an animation object is stored. Displayed information is stored in such a way, for example, that, when a sub category is "quiet," the color of an animation object is blue, and, in the case of "calm," the color is green.

The above-described displayed information for the sub category may be separately used, or combinations thereof may be also used.

The music information storage section 35 stores identifiers for categories to which music pieces belong. Specifically, the music information storage section 35 stores content IDs store in the music piece storage section 31 and sub categories in a corresponding manner. FIG. 13 shows one example of the music information storage section 35. In the example shown in the drawing, a content ID 1 is classified into a sub category of "calm", and a content ID 2 is classified into a sub category "quiet", respectively. Here, the context of a category is assumed to be the mood of a music piece, automatic classification may be realized by use of a conventional technology. According to one of the classification methods, a sound feature quantity is generated from each music sound signal, and categories are classified according to the sound feature quantities.

In the first place, a sound feature quantity is calculated from each sound signal by a method disclosed in, for example, Japanese Patent Application Laid-Open No. 6-290574, or Japanese Patent Application Laid-Open No. 2002-278547. Subsequently, a set of music pieces for learning are prepared, and a name (impression word) of a sub category representing a mood are given to the above music pieces. Then, a rule converting the sound feature quantities to impression words is created, using a decision tree, a Bayes' rule, or the like, which have been well known. Subsequently, impression words are generated by using the created conversion rule.

Figure 14:
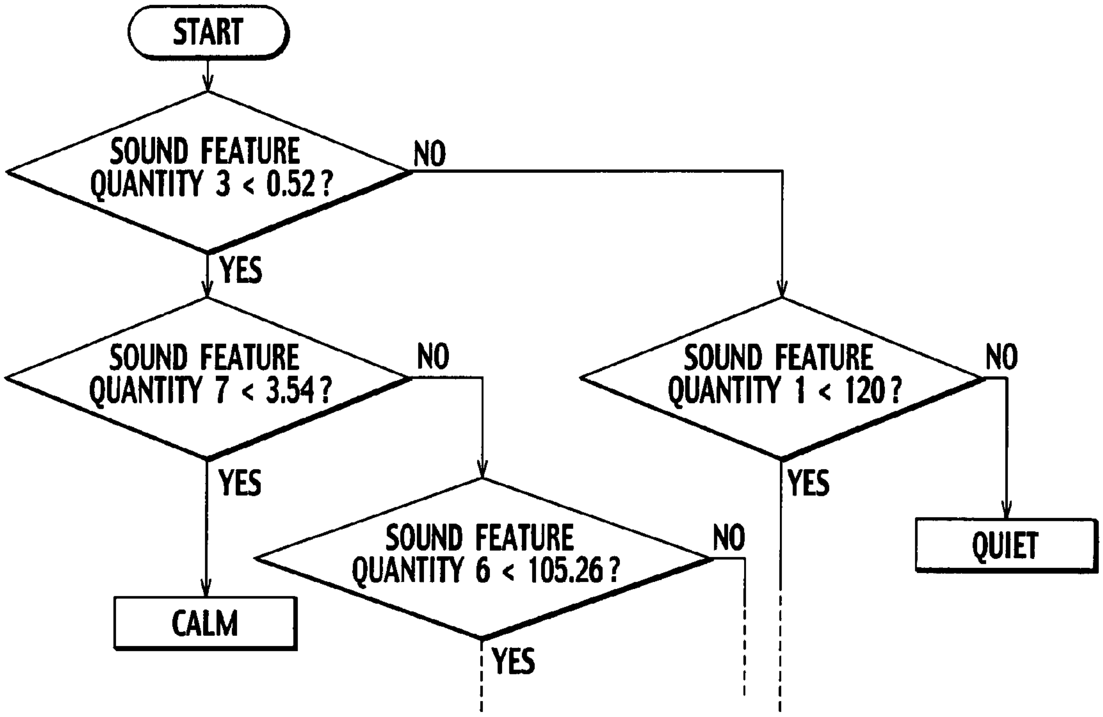
FIG. 14 is a view explaining a method for allocating an impression word by using a decision tree.

FIG. 14 shows one example of an algorithm by which impression words are assigned on the basis of the calculated sound feature quantities, using the decision tree. In the example of FIG. 14, the above music piece is classified into an impression word "quiet", when a value of the sound feature quantity 3 is "0.52" or more, and a value of the sound feature quantity 1 is "120" or more.

A method, by which an impression word is assigned on the basis of a sound feature quantity, will be explained as follows, using the Bayes' rule. It is assumed that a sound feature quantity x of a music piece to which an impression word is assigned is N-dimensional vector (x1, x2, x3, . . . , XN), and there is M kinds of impression words.

$$C_k = \underset{i \in \{1, \ldots, M\}}{\arg\max} P(C_i \mid x) = \underset{i \in \{1, \ldots, M\}}{\arg\max} P(C_i) P(x \mid C_1) \tag{1}$$

It is assumed that one certain impression word Ck (k=1 to M) corresponds to the sound feature quantity x, using formula (1). Here, P(Ci|x) is such a conditional probability that an impression word becomes Ci (i=1 to M) when a sound feature quantity is x, P(x|Ci) is such a conditional probability that a sound feature quantity becomes x when an impression word is Ci, and P(Ci) is such a prior probability that an impression word is Ci. That is, the prior probabilities P(Ci) (i=1 to M) for the M kinds of impression words and the conditional probabilities P(x|Ci) (i=1 to M) are stored beforehand, and such an impression word Ck that the product of the above probability P(Ci) and P(x|Ci) becomes maximum is allocated to an impression word for the above-described music piece and is stored in the music information storage section 35 which will be described later.

Since the above-described decision tree and Bayes' rule are only one example, it is acceptable to assign an impression word, using other classification techniques similar to the decision tree and the Bayes' rule. Moreover, in addition to the above techniques, it is acceptable to manually allocate an impression word beforehand.

Figure 15:
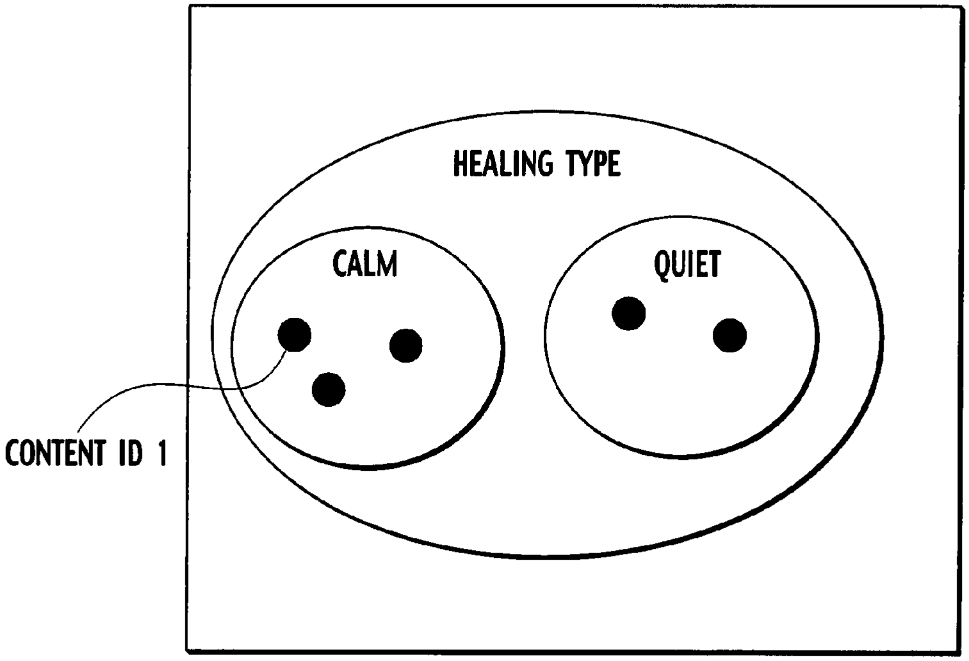
FIG. 15 is a Venn diagram explaining relations among a main category, sub categories and music pieces.

FIG. 15 shows one example of relations among a main category, sub categories, and music pieces, using a Venn diagram. As shown in the example of FIG. 15, the content ID 1 belongs to a sub category of "calm", and, at the same time, to a main category of "healing type."

The display section 40 is a display device and the like, and displays screen information created in the image data generation section 23, the title, the artist name and the like of a music piece under playback.

The playback section 50 is a playback device such as a music player, a speaker, or a headphone.

Subsequently, the operation of the music playback device 1 according to the present embodiment will be explained, referring to a flow chart shown in FIG. 16.

In the first place, the control section 20 sets an initial value of a sub category (step S10), when the music playback device 1 is activated. As a method for setting a sub category, it is acceptable to set the last sub category during the last playback, or a sub category that randomly selected. After setting the sub category, the control section 20 refers to the category information storage section 32 to set an initial value of a main category, to which the set initial sub category belongs.

Then, the playback music-piece selection section 24 selects a music piece (step S20). One music piece which belongs to the sub category set at the step S10 is selected. That is, the playback music-piece selection section 24 acquires a content ID for the music piece, which belongs to the sub category that has been set, referring to the music information storage section 35. As an acquisition method, it is acceptable to acquire content IDs according to the order of the content IDs, or to randomly acquire the content IDs.

Subsequently, the music piece selected at the step S20 is played back by the playback section 50 (step S30).

The image data generation section 23 updates screen displayed information on the display section 40 (step S40), based on the main category and the sub category under current setting. In the first place, the image data generation section 23 acquires displayed information by referring to the main-category expression-information storage section 33, based on the main category under current setting, and by referring to the sub-category expression-information storage section 34, based on the sub category under current setting. Subsequently, the image data generation section 23 generates a basic image data based on the displayed information acquired from the main-category expression-information storage section 33. Subsequently, the image data generation section 23 modifies the above-described basic image data based on the displayed information acquired from the sub-category expression-information storage section 34. Moreover, there is generated command display data to display the following commands on the display section 40: a command (main category change command) to change a main category; a command (sub category change command) to change a sub category; and a command (complete command) to complete processing. However, in a device where a user may operate even if a command is not displayed on a screen since a specific button on the input section 10 is corresponding to a command, it is acceptable not to generate command display data, and to omit displaying thereof. Moreover, there is acceptable a configuration in which information such as the title, the artist name, the playback time, and the like of a music piece under play back is displayed. The created image data is displayed by the display section 40.

Figure 17:
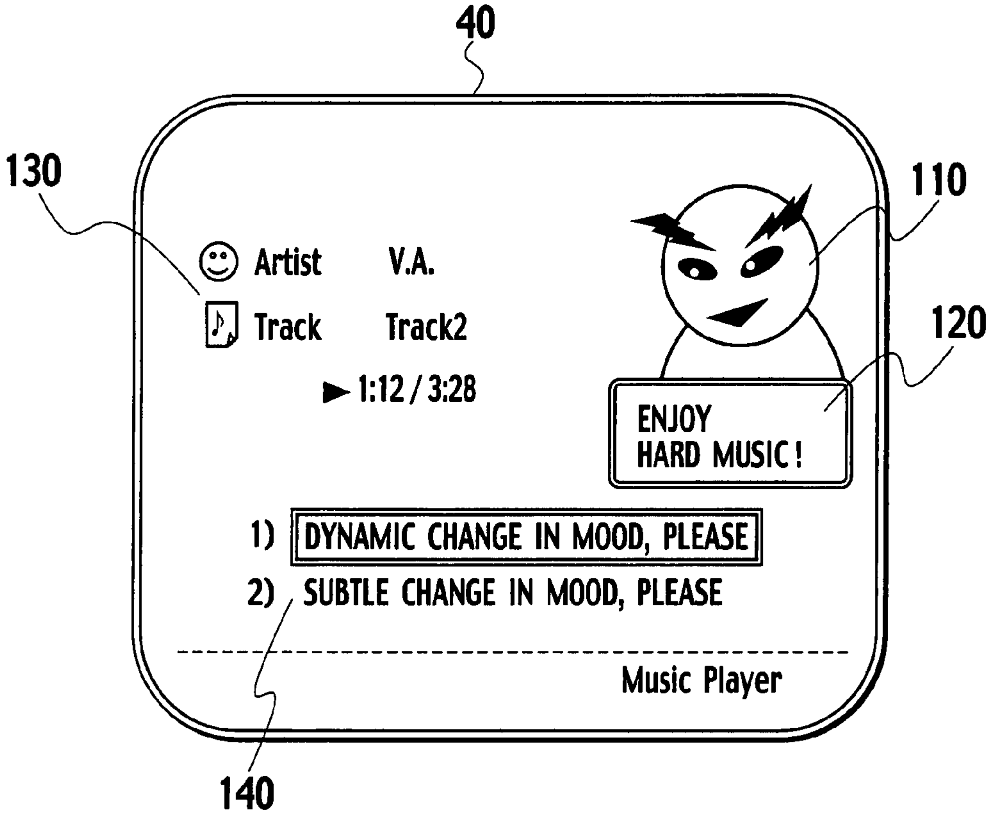
FIG. 17 is a view showing a state in which information and commands related with music pieces are displayed on a display section according to the first embodiment of the present invention.

FIG. 17 shows one example of a display screen created by the image data generation section 23. The example shown in FIG. 17 is displayed as one example on the display section 40 when a main category is "powerful type", and a sub category is "hard". A character 110 is displayed information acquired from the main-category expression-information storage section 33, and lines 120 are displayed information acquired from the sub-category expression-information storage section 34. Information such as the title, the artist name, the playback time, and the like of a music piece under current playback is displayed as playback information 130. A command list 140 is a list of commands which user may select. In the example of FIG. 17, "Dynamic Change in Mood Please" is a main category change command, and "Subtle Change in Mood Please" is a sub category change command. As a specific button on the input section 10 is corresponding to the complete command, the complete command is not displayed. When the main category change command and the sub category change command are also corresponding to a specific button on the input section 10, respectively, as described above, it is acceptable to omit displaying thereof. Moreover, though only one main category change command and, also, only one sub category change command have been prepared in the present embodiment, there is acceptable another configuration in which a plurality of main category change commands and a plurality of sub category change commands are prepared. For example, it is acceptable to display the names of sub categories, which belong to a selected main category, as a sub category change command so that the sub categories are directly selected.

Subsequently, the control section 20 determines whether a command is input by a user (step S50). When the control section 20 determines that a command has been input by a user, the process proceeds to a step S60. When a command is not input, it is checked again, after a predetermined-time waiting period (not shown), whether the command has been input.

Subsequently, the control section 20 determines whether a command input by a user is a complete command (step S60). When the above-described command is a complete command, the control section 20 terminates the process of the music playback device 1. When the above-described command is not a complete command, the process proceeds to a step S70.

Figure 18:
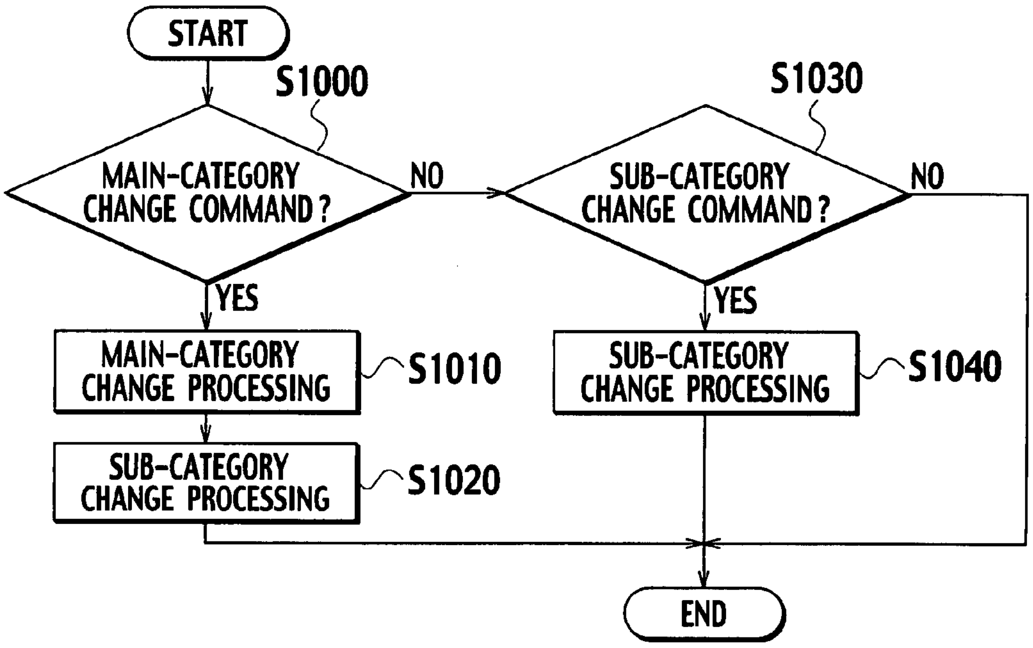
FIG. 18 is a flow chart explaining category change processing according to the first embodiment of the present invention.

Subsequently, category change processing is conducted (step S70). The category change processing will be explained, referring to a flow chart shown in FIG. 18.

In the first place, the control section 20 determines (step S1000) whether an input command is a main category change command. In the case of the main category change command, the process proceeds to step S1010, and the process proceeds to step S1030 not in the case of the main category change command. In the example shown in FIG. 17, the main category change command is "Dynamic Change in Mood Please".

When the main category change command is received, the main category change section 21 performs (step S1010) processing of main category change. That is, the main category change section 21 refers to the category information storage section 32, and selects another main category which is different from the current main category. When there is only one main category change command as shown in the example of FIG. 17, main categories are stored while corresponded with serial numbers in the category information storage section 32 beforehand, and the main category change section 21 selects a subsequent main category having the next number of the current main category according to the sequence of the serial numbers. Moreover, it is acceptable to decide a subsequent main category by use of random numbers.

FIG. 19 shows one example in which main categories are serially numbered. In the figure, setting of main categories is varied in the following order: main category 1→main category 2→main category 3→main category 1→ . . . , when the main category under current setting is assumed to be the main category 1, and setting of the main categories is changed according to the set order.

Subsequently, after completing the main category change processing, a sub category is randomly selected among sub categories belonging to the newly set main category (step S1020). That is, the sub category change section 22 selects one sub category among sub categories belonging to the newly set main category by use of random numbers, referring to the category information storage section 32.

For example, when a main category which has been newly set at the step S1010 is "healing type" in the example of the category information storage section 32 shown in FIG. 3, one sub category is randomly selected from sub categories "quiet" and "calm", wherein the sub categories are belongs to the main category of "healing type".

Subsequently, the control section 20 determines whether the input command is a sub category change command or not (step S1030). When it is a sub category change command, the process proceeds to step S1040, and when it is not a sub category change command, and the category change processing is terminated. In the example shown in FIG. 17, "Subtle Change in Mood Please" is a sub category change command.

When the sub category change command is received, the sub category change section 22 conducts sub category change processing (step S1040). That is, the sub category change section 22 selects one sub category among sub categories, which belong to the main category under current setting, according to the command input by the user, referring to the category information storage section 32 by use of the information about the main category under current setting.

For example, when there is only one sub category change command as shown in the example of FIG. 17, sub categories are stored in the category information storage section 32 beforehand after the sub categories are serially numbered, and setting is changed from the sub category under current setting to the sub category in the next turn.

FIG. 20 shows one example in which sub categories in the category information storage section 32 are serially numbered. Setting of sub categories is varied in the following order: sub category A→sub category B→sub category C→ . . . , when the main category under current setting and the current main category under setting are assumed to be the main category 1, and the sub category A, respectively, and setting of the sub categories is changed according to the numbered order. As long as the main category is set to "main category 1", any sub category, such as "sub category D", which belongs to any other main category is not selected. Here, the change processing may be realized at random. In that case, the categories may be stored without such serial numbers as shown in the example of FIG. 3.

Here, when the received command is a main category change command as described above, a sub categories is selected according to a predetermined order, or by use of random numbers after the current main category is changed to another one according to a predetermined order, or by use of random numbers. After a sub category is automatically selected as a result of the main category change, there may be a case in which a user wishes to change the mood in a subtle manner. In this case, the user merely needs to continuously input a sub category change command so that the above-described sub category change processing (steps S1030 and S1040) is performed thereafter.

Figure 16:
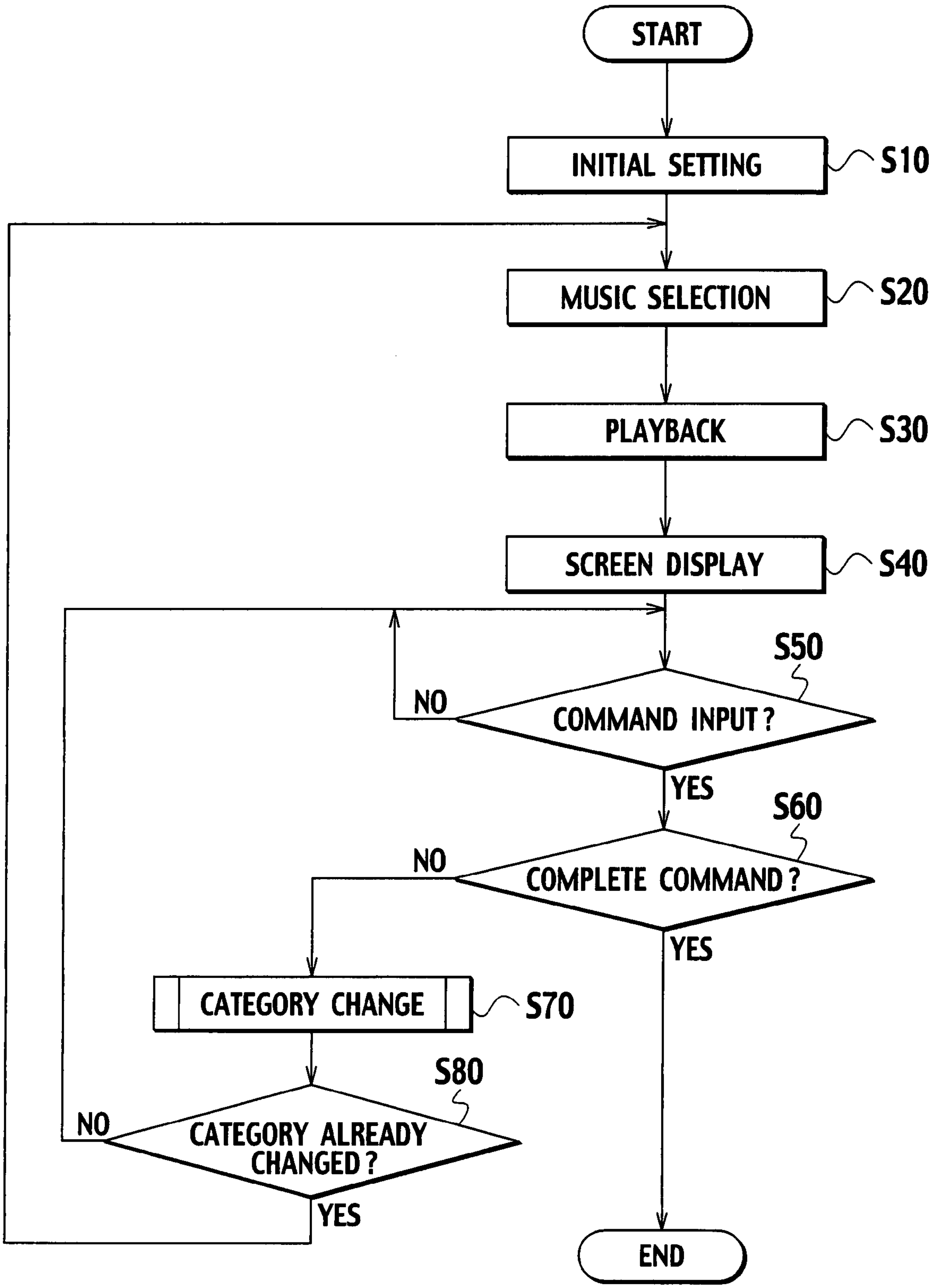
FIG. 16 is a flow chart explaining processing according to the first embodiment of the present invention.

Now, returning to the explanation of the flow chart shown in FIG. 16, the processing returns to the music-piece selection processing at the step S20 when a category is changed by the category change processing, and the processing returns to the command-input determination processing at the step S50 when a category is not changed by the category change processing (step S80).

As described in detail above, according to the music playback device 1 of the present embodiment, a user can intuitively search a music piece based on a more appropriate image for the following reasons: specifically, first, a user can operate a music playback device based on the music piece under current playback. An input operation of the degree of difference (deviation) between a desired music piece and the music piece under current playback into a music playback device is a more intuitive operation than one in the related art. Secondary, a mood of a music piece is expressed by means of not only letters but also a combination of a character image, color, and words as shown in FIG. 17.

Moreover, the music playback device 1 can be applied to a mobile terminal device, an audio player, and the like, which are small, and have a small-sized screen and limitations in adopting an input device, because input operation is simple, and complex operations are not required. Furthermore, a desired music piece can be easily selected even under a state in which it is difficult to perform complex operations, because a user need not search impression words or song titles in a long list, and not input sentences or words.

Moreover, as categories with a two layered structure including main categories and sub categories are used, each music piece is classified according to sub categories, and basic screen display for playback of a music piece is performed according to main categories, a number of kinds for screen display is not increased more than required even when a number of categories (sub categories) into which music pieces are classified is increased. Accordingly, a music piece search method with excellent viewability can be provided.

Second Embodiment

A music playback device 2 according to a second embodiment of the present invention will be explained. The music playback device 2 according to the present embodiment has a feature that a user may quickly reach contents desired by a user, based on a configuration in which main categories are displayed as a list for selection.

Figure 21:
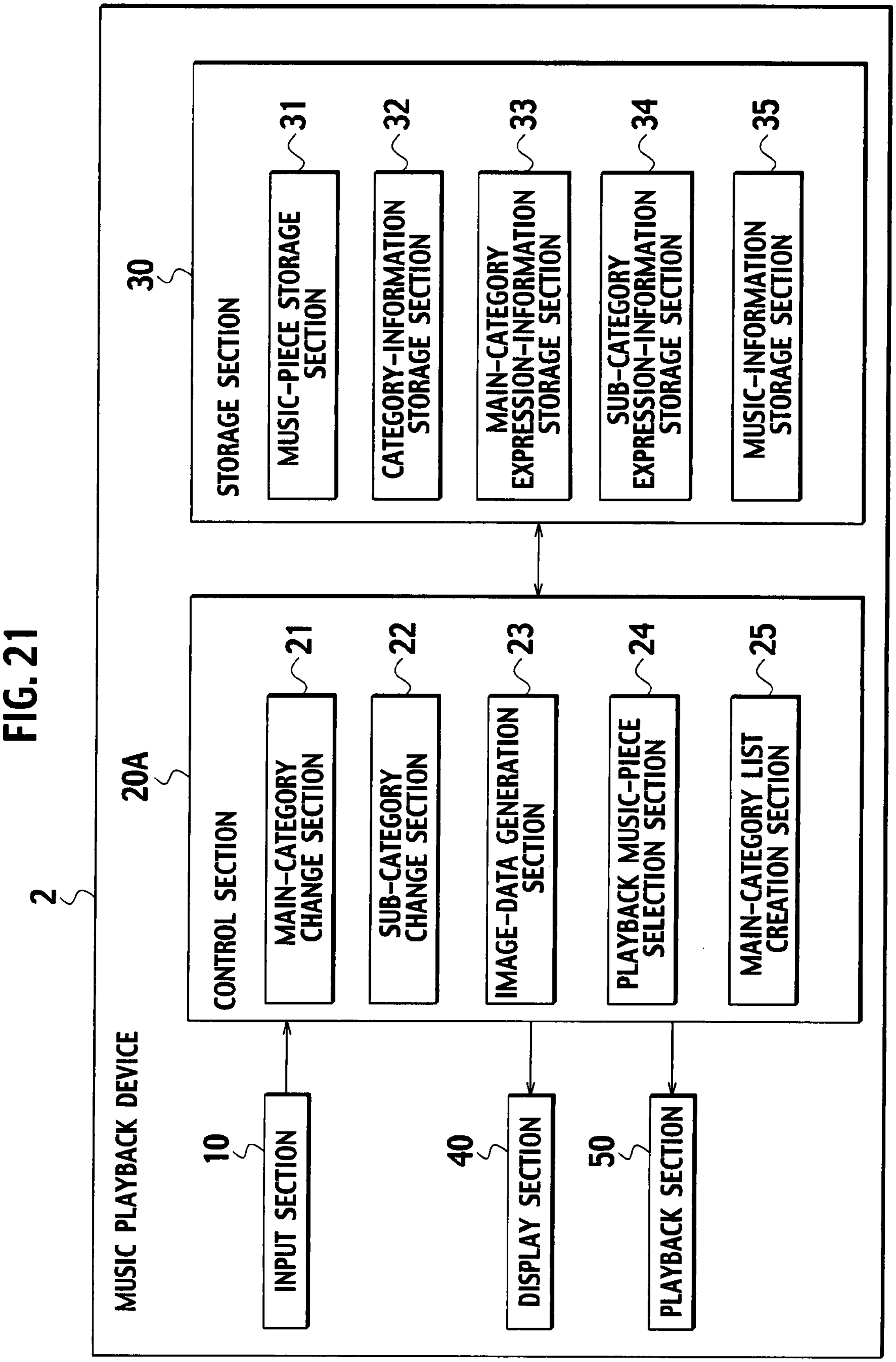
FIG. 21 is a block diagram showing a music playback device 2 according to the second embodiment of the present invention.

The configuration of the music playback device 2 according to the present embodiment will be explained, referring to FIG. 21. The configuration of the music playback device 2 is different from that of the music playback device 1 in a point that a main-category list creation section 25 is added to a control section 20A in the music playback device 2.

The main-category list creation section 25 added to the music playback device 2 creates displayed information for list display of main categories. The main-category list creation section 25 acquires all the names of the main categories from a category information storage section 32, and, then, obtains displayed information for main categories stored in a main-category expression-information storage section 33, based on the above-described acquired names of the main categories, and creates a screen image for list display.

Figure 22:
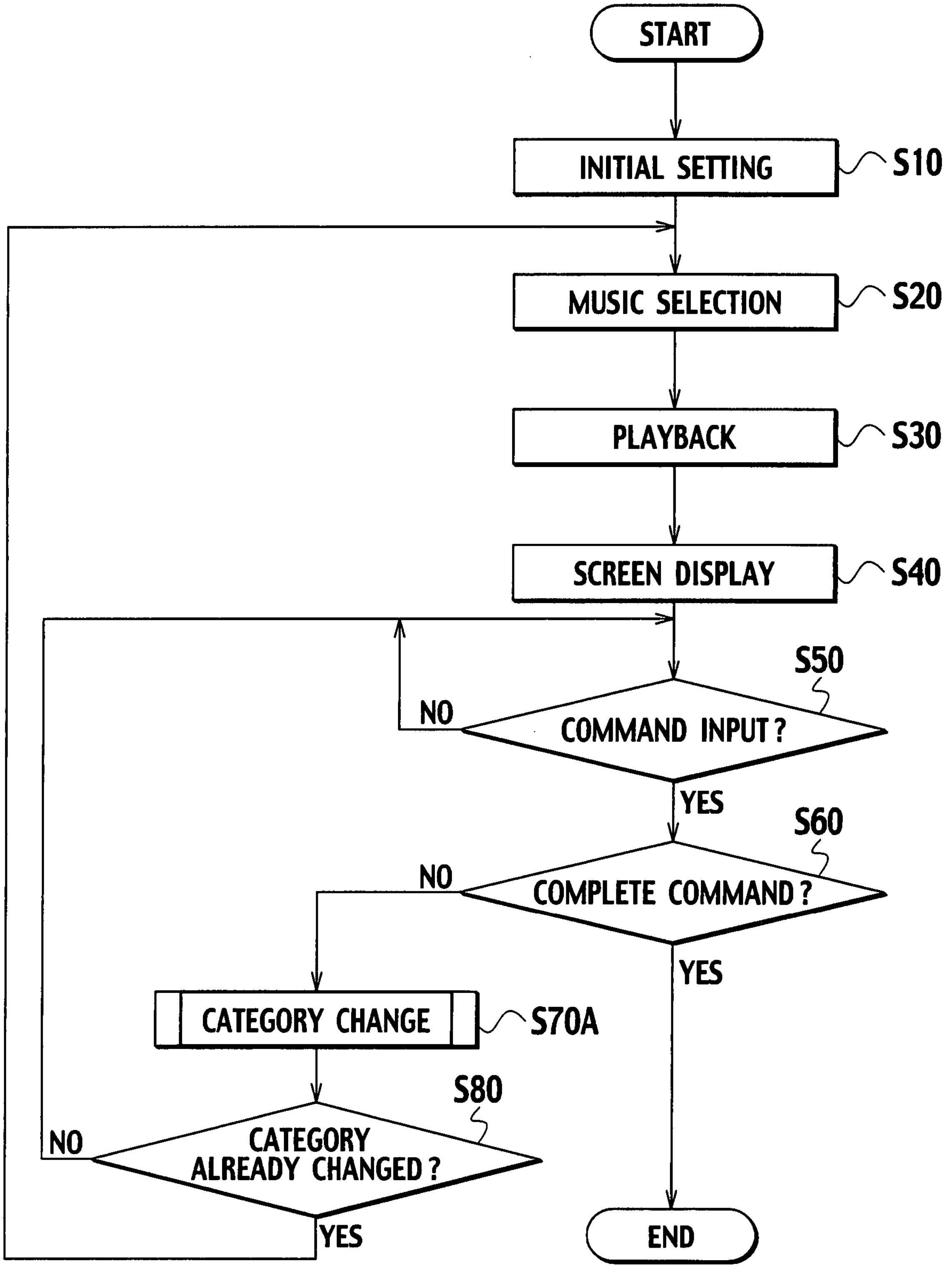
FIG. 22 is a flow chart explaining processing according to the second embodiment of the present invention.

Subsequently, operations of the music playback device 2 according to the present embodiment will be explained, referring to a flow chart shown in FIG. 22. The operations of the music playback device 2 according to the second embodiment and those of the music playback device 1 according to the first embodiment are different from each other in the category change processing at the step S70. Then, different operations in the category change processing from those of the device 1 will be explained. In the category change processing (step S70A) according to the present embodiment, a main-category list selection command, in addition to a main category change command and a sub category change command, is processed.

Figure 23:
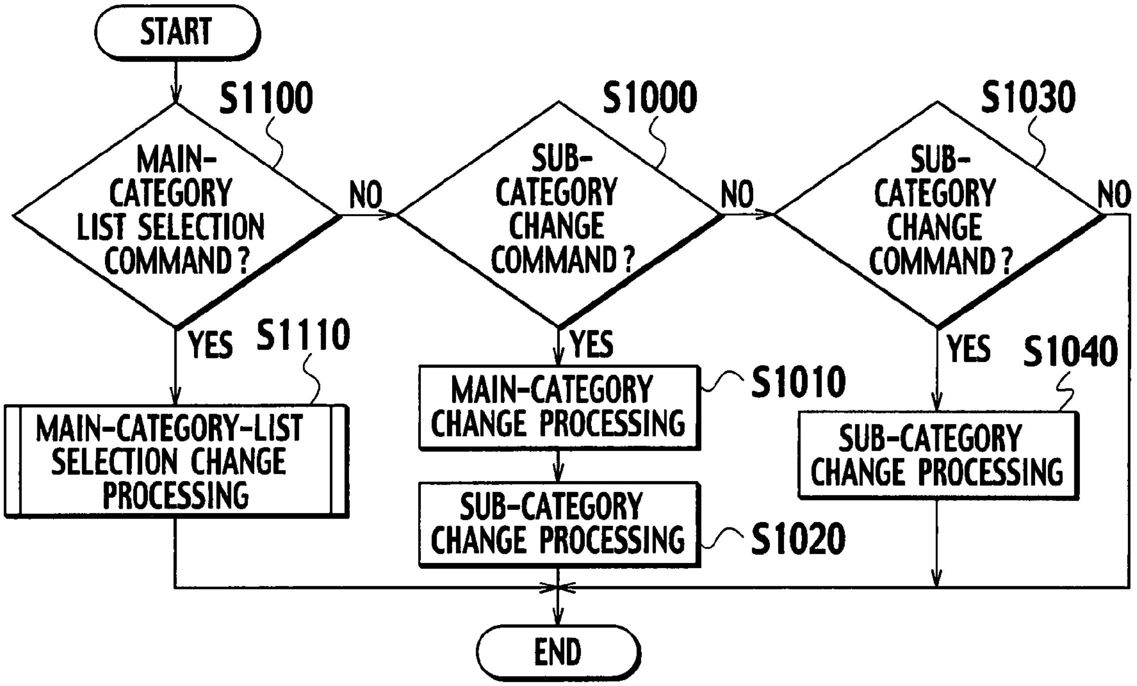
FIG. 23 is a flow chart explaining category change processing according to the second embodiment of the present invention.

The category change processing (step S70A) of the music playback device 2 will be explained in detail, referring to a flow chart shown in FIG. 23. The flow chart shown in FIG. 23 is obtained by newly adding a step S1100 and a step S1110 to the flow chart shown in FIG. 18, which has been explained in the first embodiment. The newly added steps will be explained, but the explanation of other operations will be omitted, because the other ones are similar to those of the music playback device 1.

Figure 24:
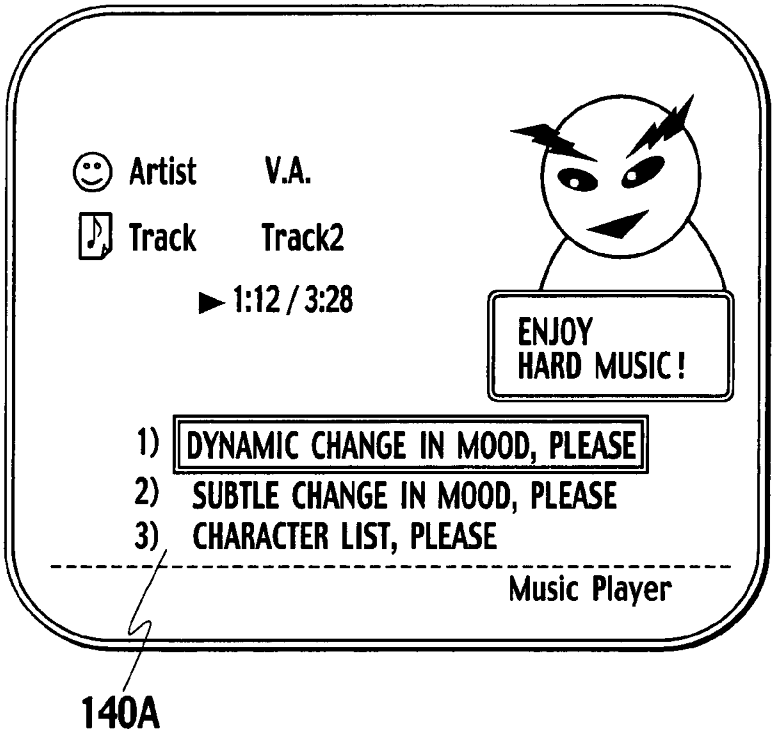
FIG. 24 is a view showing a state in which information and commands related with music pieces are displayed on a display section according to the second embodiment of the present invention.

When a command input by a user is a main-category list selection command, the process in the control section 20A proceeds to a step S1110 for main-category list display processing and the process proceeds to step S1000 not in the case of the above selection command (step S1100). There may be another configuration in which a dedicated command like “Character List, Please” is newly provided as shown in a command list 140A of FIG. 24, and is allocated as a main-category list selection command, or a configuration in which a dedicated button (not shown) for allocation is provided in an input section 10.

Figure 25:
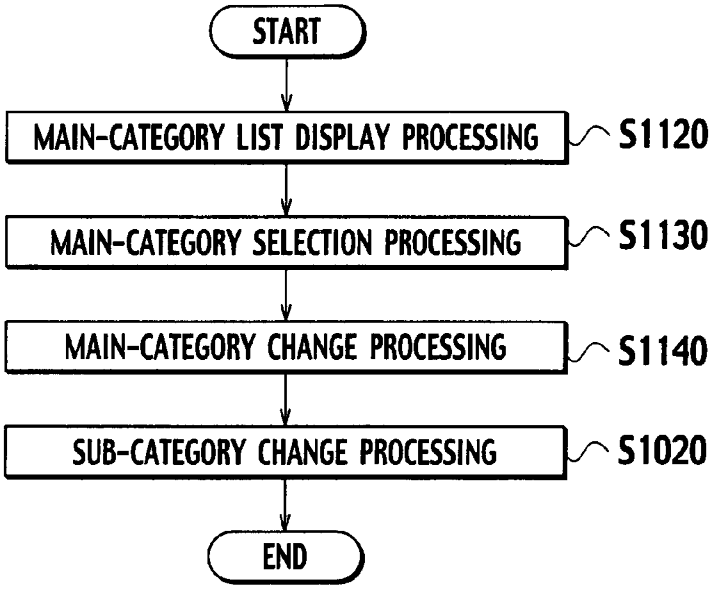
FIG. 25 is a flow chart explaining process flow for setting an initial value according to the second embodiment of the present invention.

When it is determined that the main-category list display command is received, the main-category-list selection change processing is conducted in the control section 20A (step S10). The main-category-list selection change processing will be explained, referring to a sub flow chart shown in FIG. 25.

In main-category list selection processing, a main category list is displayed in the first place (step S1120). Hereinafter, processing at step S1120 will be explained.

Figure 26:
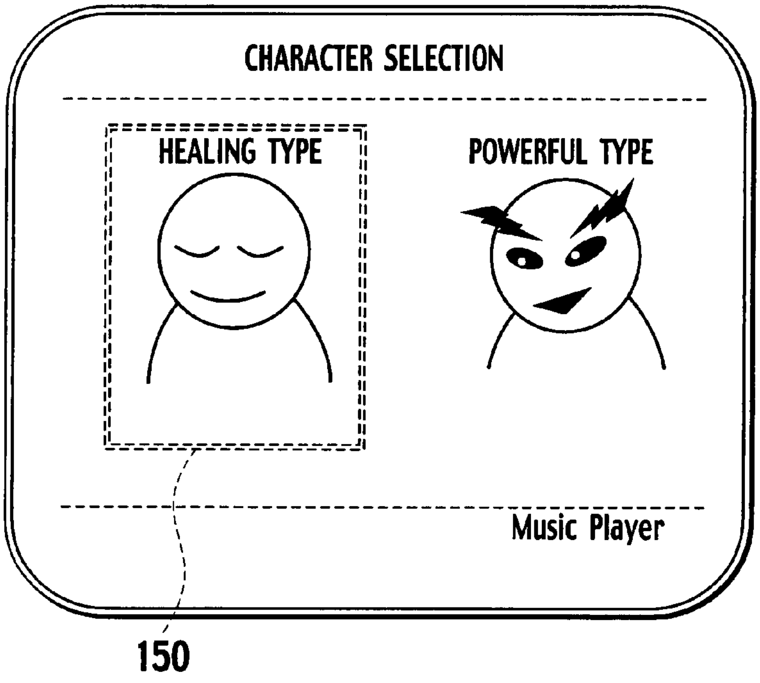
FIG. 26 is a view showing one example of image data created by a main-category list creation section according to the second embodiment of the present invention.

In the first place, the main-category list creation section 25 acquires all the names of main categories from the category information storage section 32. Subsequently, displayed information for the main categories are read from the main-category expression-information storage section 33, based on the above-described acquired main category names. Then, the main-category list creation section 25 creates a screen image, in which the read displayed information for the main categories are arranged in a list form, for display on a display section 40. FIG. 26 shows one example of the displayed information created by the main-category list creation section 25. Displayed information for a main category of “healing type” is shown on the left side on the screen, and displayed information for a main category of “powerful type” is shown on the right side on the screen. The step S1120 has been explained as described above.

Subsequently, the control section 20A accepts (step S1130) selection among main categories displayed as a list from a user after displaying the main category list. It is determined in the control section 20A, based on input information by the input section 10, which main category is selected. For example, when a cursor move button 11 in FIG. 2A is pushed, a selection frame 150 shown in FIG. 26 is changed, and, when a decision button 12 is pushed, the main category shown by the selection frame 150 is decided as a subsequent main category to be changed.

Subsequently, the main category change section 21 sets the selected main category (step S1140). The main category change section 21 acquires a name of a main category in correspondence to the above-described selection information from the main-category list creation section 25 according to information selected at the step S1130, and reads a corresponding main category, referring to the category information storage section 32 by used of the above-described acquired name of the main category name.

After newly changing the main category, the process proceeds to a step S1020 for sub category change processing. The explanation of the sub category change processing at the step S1020 will be omitted, because the processing is similar to that of the first embodiment.

It is acceptable to use, instead of the initial setting at the step S10, the above-described method for selecting a main category from a main category list when the music playback device 2 is started. In the above case, the initial setting at the step S10 is replaced by the main-category-list selection change processing at the step S1110.

As described in detail above, since the music playback device 2 according to the present embodiment provides a method for selecting a main category in a direct manner, a user can quickly find a music piece that suits the user’s taste enough.

Third Embodiment

A music playback device 3 according to a third embodiment of the present invention will be explained. The music playback device 3 according to the present embodiment has a feature that a user can easily identify his or her favorite categories at a glance and enjoy the music playback device more, as the displayed information about the categories changes based on the number of playback times.

Figure 27:
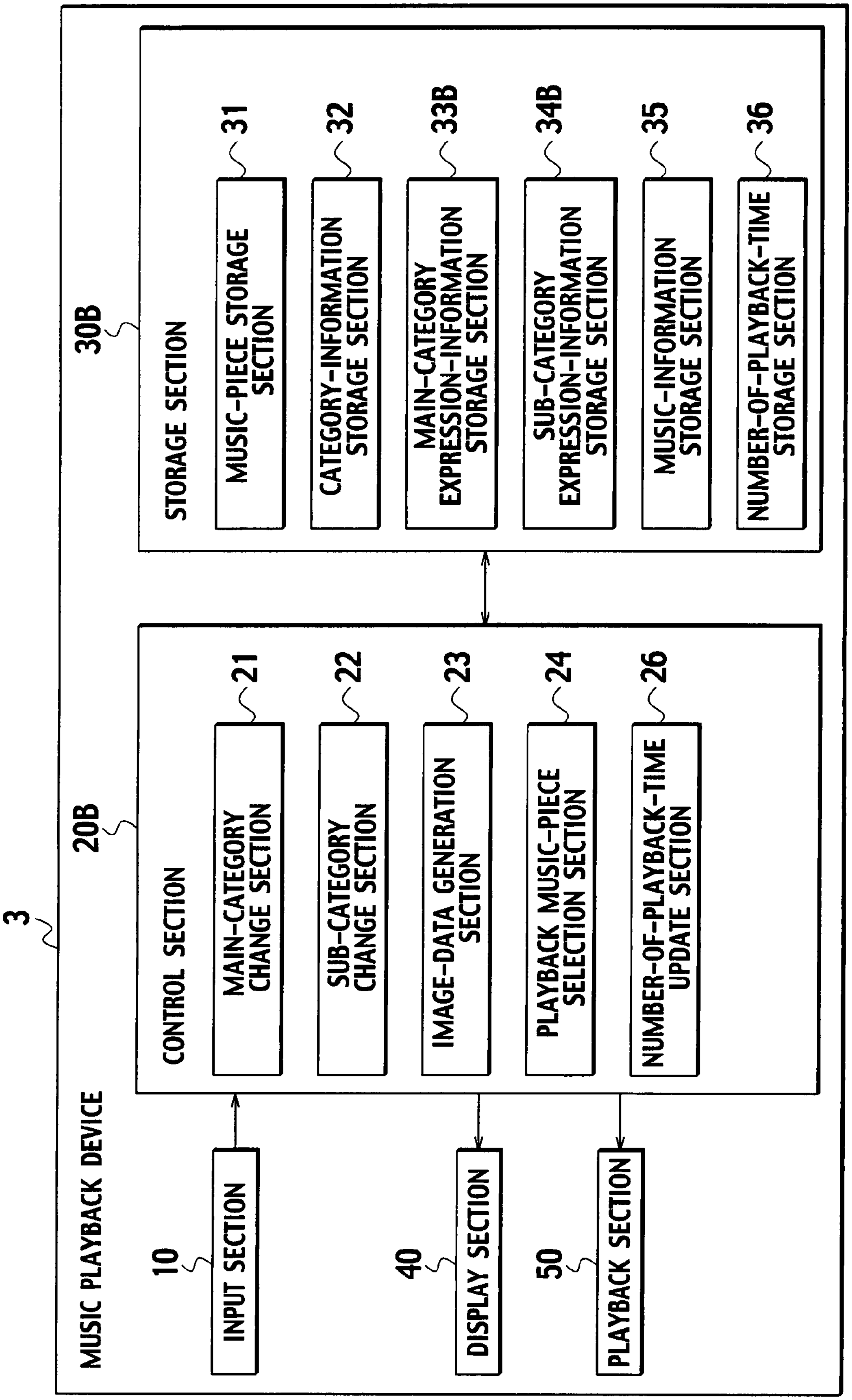
FIG. 27 is a block diagram of a music playback device 3 according to a third embodiment of the present invention.

The configuration of the music playback device 3 according to the present embodiment will be explained, referring to FIG. 27. The music playback device 3 has a control section 20B corresponding to the control section 20 shown in FIG. 1, and a storage section 30B corresponding to the storage section 30 shown in FIG. 1. But, the configurations of the sections 20B and 30B are different from those of the music playback device 1. The configuration of the music playback device 3 is different from that of the music playback device 1 in a point that a number-of-playback-time update section 26 is added to the control section 20B in the music playback device 3, and a number-of-playback-time storage section 36 is added to the storage section 30B. Moreover, a main-category expression-information storage section 33B in the storage section 30B is corresponding to the main-category expression-information storage section 33 in FIG. 1, and a sub-category expression-information storage section 34B in the storage section 30B is corresponding to the sub-category expression-information storage section 34 in FIG. 1, but stored information is different from each other between the section 33B in FIG. 27 and the section 33 in FIG. 1, and between the section 34B in FIG. 27 and the section 34 in FIG. 1. In the present embodiment, the number-of-playback-time update section 26, the playback history storage section 36, the main-category expression-information storage section 33B, and the sub-category expression-information storage section

34B will be explained. Other sections are similar to those of the music playback device 1. Accordingly, explanation of the other sections will be omitted.

The number-of-playback-time update section 26 has a function to update the numbers of playback times which are stored for each category in the later-described number-of-playback-time storage section 36. According to the specifically-described function, it is checked to which category a played music piece belongs, the number of playback times of the corresponding category is acquired from the number-of-playback-time storage section 36, and the number of playback times is incremented by one.

The number-of-playback-time storage section 36 is a section storing the playback frequencies for each category. FIG. 28 shows one example of a format for the number-of-playback-time storage section 36. This example shows that the number of playback times at present is ten for music pieces belonging to a sub category of "quiet", five for music pieces belonging to a sub category of "calm", and thirty for all the music pieces belonging to a main category of "healing type".

The main-category expression-information storage section 33B stores displayed information by which there are different kinds of displays on the screen of the display section 40 for each of main categories in a manner similar to that of the main-category expression-information storage section 33 in the music playback device 1, and, furthermore, stores displayed information for display changes according to the numbers of playback times for music pieces belonging to each category. FIG. 29 shows one example of the main-category expression-information storage section 33B. In the example of the main-category expression-information storage section 33B shown in FIG. 29, the numbers of playback times are divided into predetermined ranges for each of main categories, and image data of characters corresponding to each zone is stored.

The sub-category expression-information storage section 34B stores displayed information such as character information, decorative items decorating displayed information for the main-category expression-information storage section 33B, and detailed rules for animation in a manner similar to that of the sub-category expression-information storage section 34 in the music playback device 1, and, furthermore, stores displayed information for display changes according to the numbers of playback times for music pieces belonging to each category.

FIG. 30 shows one example in which color information is stored in the sub-category expression-information storage section 34B. In the example shown in FIG. 30, colors are configured to become deeper as the number of playback times of music pieces within a category is increased. Moreover, FIG. 31 shows one example in which decorative items for characters are stored in the sub-category expression-information storage section 34B. In the example shown in FIG. 31, the number of stars as the decorative item is also configured to be increased in the case of a sub category of "quiet" as the number of playback times is increased. Moreover, the number of heart marks is configured to be increased in the case of a sub category of "calm" as the number of playback times is increased.

In the main-category expression-information storage section 33B, and the sub-category expression-information storage section 34B, it is acceptable to use a configuration in which characters are displayed small in the case of the small number of playback times of music pieces within a category, and characters are expressed large in the case of the large number. It is preferable to use a configuration in which a category with a larger number of playback times causes the expression to become more prominent.

Figure 32:
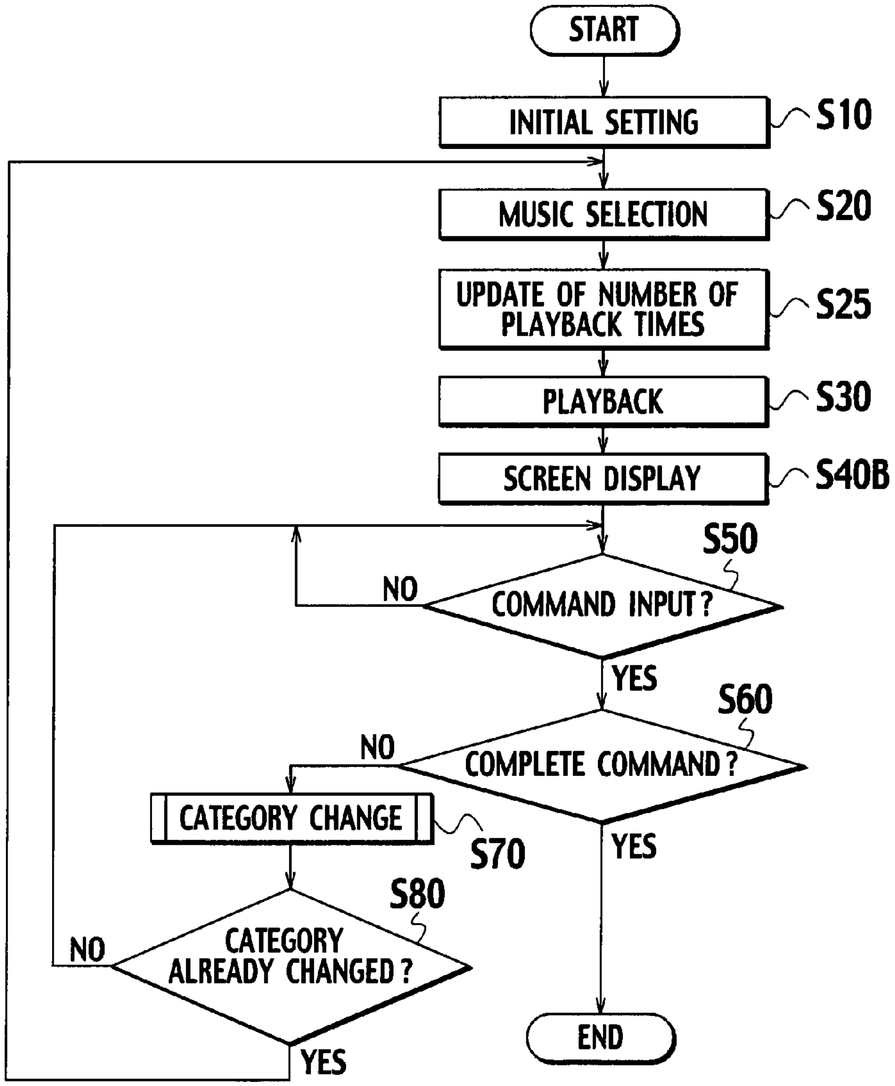
FIG. 32 is a flow chart explaining processing according to the third embodiment of the present invention.

Subsequently, operations of the music playback device 3 according to the present embodiment will be explained, referring to a flow chart shown in FIG. 32. In comparison with the operations of the music playback device 1 according to the first embodiment, the operations of the music playback device 3 according to the third embodiment includes a newly added step (step S25) of number-of-playback-time update processing, and a step of screen display processing with a different kind of operations (step S40B). Then, the number-of-playback-time recording processing and the screen display processing with a different kind of operations will be explained in the present embodiment.

After selecting a music piece for playback in a playback music-piece selection section 24, the number-of-playback-time update section 26 records the number of playback times (step S25). The number-of-playback-time update section 26 refers to the number-of-playback-time storage section 36 based on the main category and the sub category under current setting to acquire the number of playback times for the sub category and the number of playback times for the main category. Each of the above-described acquired numbers of playback times is incremented by one, and the updated numbers of playback times are stored in the number-of-playback-time storage section 36.

After starting playback of the music piece selected at a step S30, screen display processing is performed (step S40B). In the first place, an image data generation section 23 refers to the number-of-playback-time storage section 36 based on the main category and sub category under current setting to acquire the number of playback times for the sub category and the number of playback times for the main category. Subsequently, the image data generation section 23 refers to the main-category expression-information storage section 33B based on the above-referred number of playback times for the main category and the main category under current setting to obtain displayed information for the main category and set this displayed information as a background for the displayed information. Then, the image data generation section 23 refers to the sub-category expression-information storage section 34B based on the above-referred number of playback times for the sub category and the sub category under current setting to obtain displayed information for the sub category and add this displayed information to the above-described set displayed information.

Figure 33A:
FIG. 33A is a view showing one example of displayed information combining main-category expression information and sub-category expression information according to the third embodiment of the present invention.
Figure 33B:
FIG. 33B is a view showing one example of displayed information combining main-category expression information and sub-category expression information according to the third embodiment of the present invention.

Here, there is illustrated an example in which the characters (FIG. 29) are used as displayed information for main categories, and the decorative items (FIG. 31) are used as displayed information for sub categories. When a main category is "healing type", a sub category is "quiet", and both the number of playback times for the main category and that for the sub category are ten, the character for the main category is located at the first row and the first column (excluding column names) in FIG. 29, and the decorative item for the sub category is located at the first row and the first column in FIG. 31. FIG. 33A shows an example of displayed information obtained by combining the above character and the above item. Moreover, when the number of playback times for the sub category is increased by 100 to 110, the character for the main category becomes a character located at the first row and the second column in FIG. 29, and the display item for the sub category becomes an item located at the first row and the second column in FIG. 31. FIG. 33B shows an example of displayed information obtained by combining the above character and the above item.

There is not necessarily applied a configuration in which displayed information for both the sub category and the main one is simultaneously changed, based on the above-described number of playback times, and there may be adopted another configuration in which the displayed information for either the sub category or the main one is changed.

Moreover, though the number of playback times has been increased after selecting a music piece for playback in the present embodiment, there may be applied another configuration in which the number of playback times is increased when the playback is finished, or after the playback is performed for a predetermined period.

Moreover, there may be applied further another configuration in which a main category list is displayed for selection by combination of the music searching device 3 explained in the present embodiment and the music searching device 2 explained in the second embodiment.

As described in detail above, the music playback device 3 according to the present embodiment has an advantage that a user can easily identify his or her favorite categories at a glance and enjoy the music playback device with his or her particular interest for a long time, as the displayed information about the categories changes based on the number of playback times.

Fourth Embodiment

A music playback device 4 according to a fourth embodiment of the present invention will be explained. The music playback device 4 according to the present embodiment has a feature that a user can easily recognize his or her collection tendency and enjoy the music playback device more, as the displayed information about a category changes based on the number of music pieces belonging the category.

Figure 34:
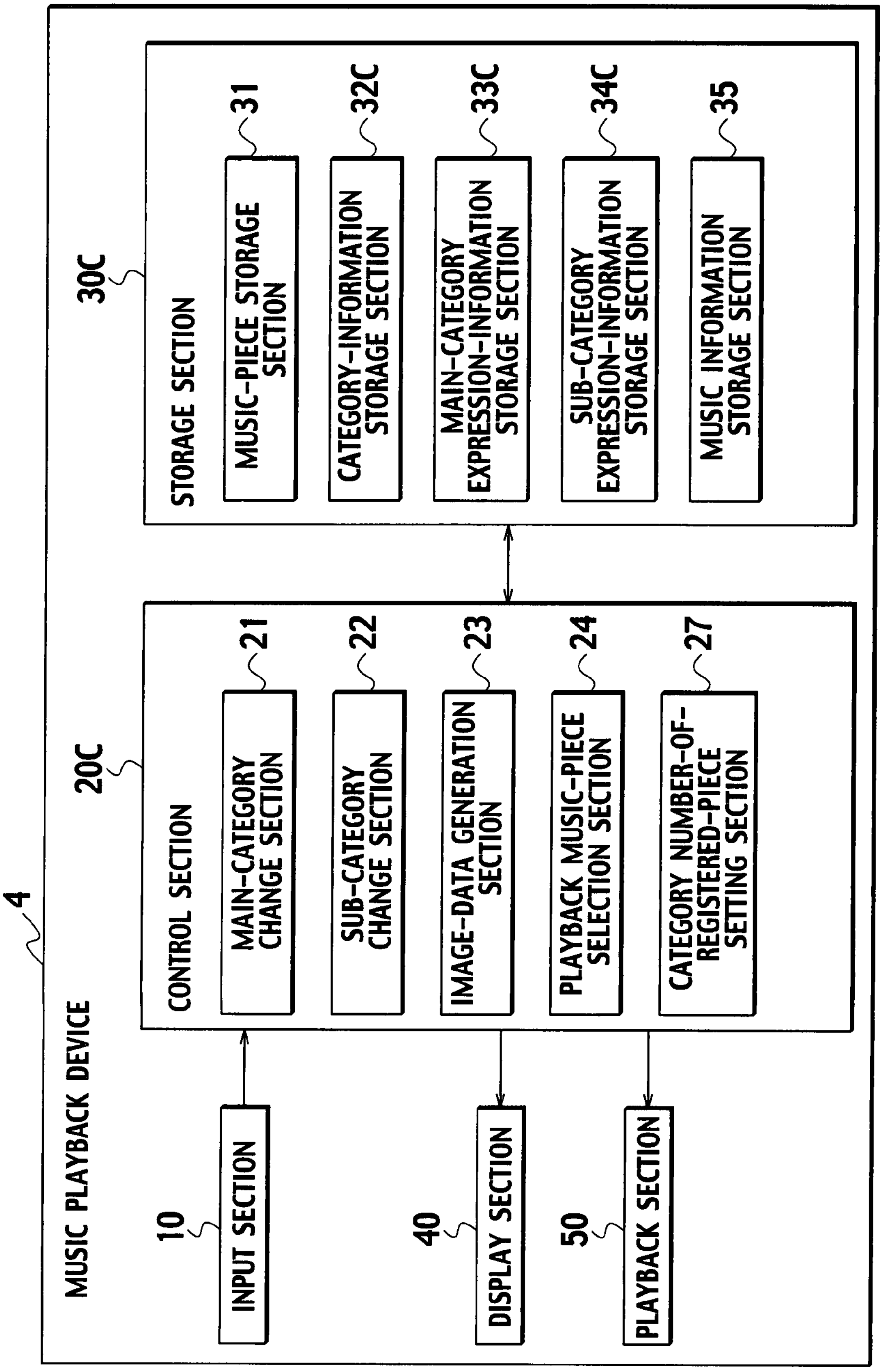
FIG. 34 is a block diagram of a music playback device 4 according to a fourth embodiment of the present invention.

The configuration of the music playback device 4 according to the present embodiment will be explained, referring to FIG. 34. The music play back device 4 has a control section 20C and a storage section 30C, wherein the control section 20C is corresponding to the control section 20 in FIG. 1, and the storage section 30C is corresponding to the storage section 30 in FIG. 1. But the inside configurations of the sections 20C and 30C are slightly different from that of the music playback device 1. The music playback device 4 and the music playback device 1 are different from each other in a point that a category number-of-registered-piece setting section 27 is added to the control section 20C in the music playback device 4. Moreover, a category information storage section 32C in the storage section 30C is corresponding to the category information storage section 32 in FIG. 1, a main-category expression-information storage section 33C in the storage section 30C is corresponding to the main-category expression-information storage section 33 in FIG. 1, and a sub-category expression-information storage section 34C in the storage section 30C is corresponding to the sub-category expression-information storage section 34 in FIG. 1, but the stored information is different from one another. In the present embodiment, the category number-of-registered-piece setting section 27, the category information storage section 32C, the main-category expression-information storage section 33C, and the sub-category expression-information storage section 34C will be explained. Other sections are similar to those of the music playback device 1. Accordingly, explanation of the other sections will be omitted.

The category number-of-registered-piece setting section 27 adds up the number of music pieces for each category, and stores the result in the category information storage section 32C.

The category information storage section 32C stores a corresponding relation between each main category and sub categories belonging to each main category and the number of music pieces (registered music pieces) belonging to each main category and each sub category. FIG. 35 shows one example of a format for the category information storage section 32C. The example shown in FIG. 35 shows that the number of registered music pieces belonging to a sub category of "quiet" is 200, the number of registered music pieces belonging to a sub category of "calm" is 250, and the number of registered music pieces belonging to the main category of "healing type" is 600 as a whole.

The main-category expression-information storage section 33C stores displayed information by which there are different kinds of displays on the screen of the display section 40 for each of main categories in a manner similar to that of the main-category expression-information storage section 33 in the music playback device 1, and, furthermore, stores displayed information according to zones, wherein the numbers of registered music pieces are divided into a plurality of the zones. FIG. 36 shows one example of the main-category expression-information storage section 33C. In the example of the main-category expression-information storage section 33C, characters are stored according to the types for each of main categories, and to the numbers of registered music pieces for each of main categories.

The sub-category expression-information storage section 34C stores displayed information such as character information, decorative items decorating displayed information for the main-category expression-information storage section 33C, and detailed rules for animation in a manner similar to that of the sub-category expression-information storage section 34 in the music playback device 1, and, furthermore, stores changes in expressions according to the numbers of registered music pieces in each of categories.

FIG. 37 shows one example in which color information is stored in the sub-category expression-information storage section 34C. In the example shown in FIG. 37, colors are configured to become deeper as the number of registered music pieces in each of categories is increased. Moreover, FIG. 38 shows one example in which decorative items for characters are stored in the sub-category expression-information storage section 34C. In the example shown in FIG. 38, the number of stars as the decorative item is also configured to be increased in the case of a sub category of "quiet" as the number of registered music pieces is increased. Moreover, the number of heart marks is configured to be increased in the case of a sub category of "calm" as the number of registered music pieces is increased.

In the main-category expression-information storage section 33C, and the sub-category expression-information storage section 34C, it is acceptable to use a configuration in which characters are displayed small in the case of the small number of registered music pieces for music pieces within each of categories, and characters are expressed large in the case of the large number. It is preferable to use a configuration in which a category with a larger number of registered music pieces causes the expression to become more prominent.

Figure 39:
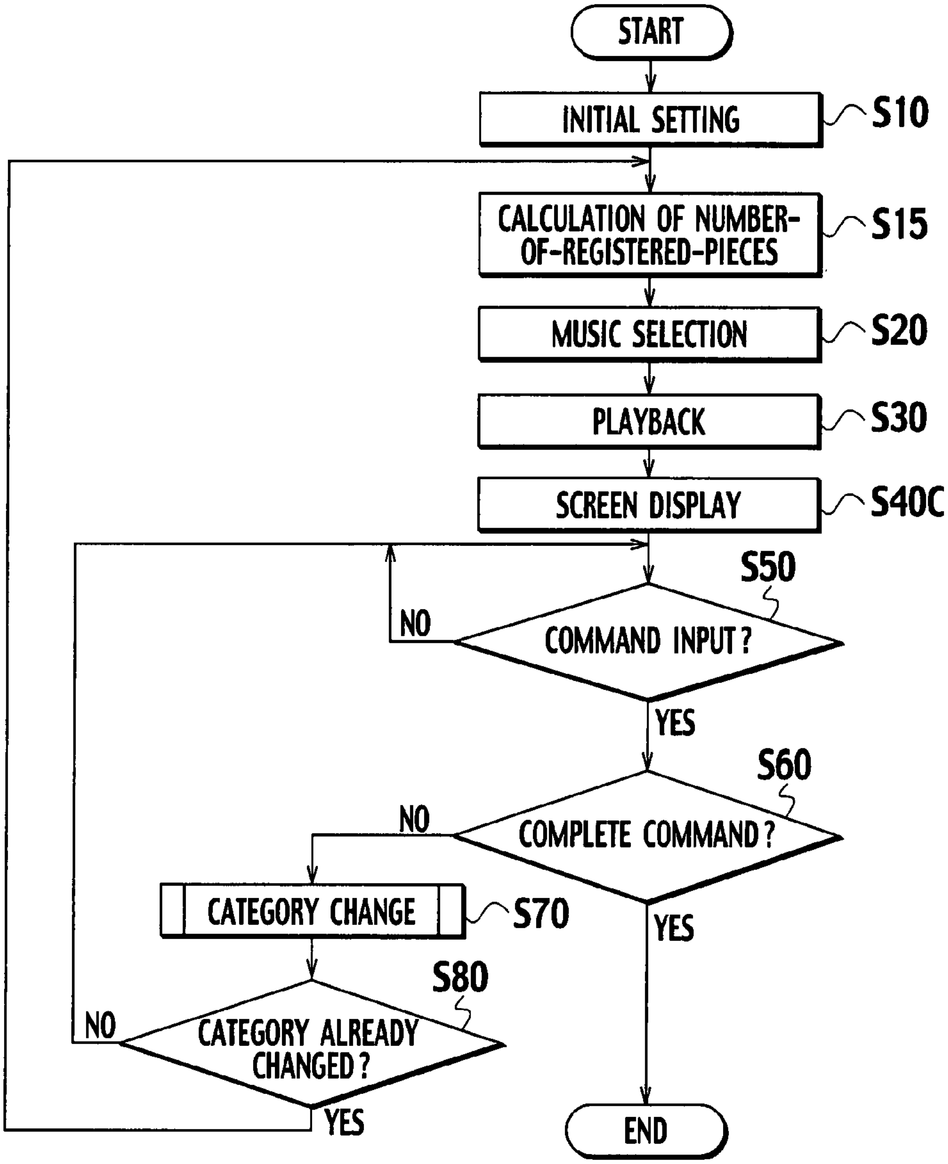
FIG. 39 is a flow chart explaining processing according to the fourth embodiment of the present invention.

Subsequently, operations of the music playback device 4 according to the present embodiment will be explained, referring to a flow chart shown in FIG. 39. In comparison with the operations of the music playback device 1 according to the first embodiment, the operations of the music playback device 4 according to the fourth embodiment includes a newly added step of number-of-registered-piece calculating processing (step S15), and a step of screen display processing with different details (step S40). Then, the number-of-registered-piece calculating processing (step S15), and the screen display processing with different operations (step S40) will be explained in the present embodiment. The explanation of other processing will be omitted, because the other processing is similar to that of the first embodiment.

In the number-of-registered-piece calculating processing, the category number-of-registered-piece setting section 27 sets the numbers of music pieces in each of sub categories, and, accordingly, sets the numbers of music pieces in each of main categories (step S15). Hereinafter, step S15 will be explained in detail.

In the first place, the category number-of-registered-piece setting section 27 acquires one content ID for a music piece from a music piece storage section 31. Subsequently, based on the acquired content ID, a sub category, to which the music piece is belonging, is acquired, referring to a music information storage section 35, and the number of registered music pieces in the corresponding sub category is incremented by one. The above processing is conducted for all music pieces, and the numbers of registered music pieces for each of sub categories are obtained. When the above processing is completed for all the music pieces, the above calculated numbers of registered music pieces for each of sub categories are stored in the category information storage section 32C. At this time, the numbers of registered music pieces for each of sub categories belonging to each of main categories are totaled for each of main categories to calculate the numbers of registered music pieces for each of main categories for storage in the category information storage section 32C. Here, information on the location of a sub category in main categories is acquired from the category information storage section 32C. The above explanation has been made for the step S15.

As the subsequent processing (step S20) for selection of a music piece, and the processing (step S30) for playback are similar to those of the first embodiment, the explanation will be omitted.

In the screen display processing, an image data generation section 23 creates displayed information for display on the display section 40 (step S40C). Hereinafter, step S40C will be explained in detail.

In the first place, based on a main category and a sub category under current setting, the image data generation section 23 acquires the number of registered music pieces for the sub category and that of registered music pieces for the main category, referring to the category information storage section 32C. Subsequently, based on the above acquired number of registered music pieces for the main category and the main category under current setting, the image data generation section 23 acquires displayed information for the main category, referring to the main-category expression-information storage section 33C, and set the displayed information as a background of the displayed information. Then, based on the number of registered music pieces for the above acquired sub category and a sub category under current setting, the image data generation section 23 acquires displayed information for the sub category, referring to the sub-category expression-information storage section 34C, and add the displayed information to the above set displayed information. The above explanation has been made for the step S40C.

Figure 40:
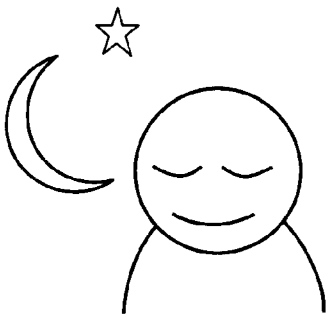
FIG. 40 is a view showing one example of displayed information combining main-category expression information and sub-category expression information according to the fourth embodiment of the present invention.

Here, there is illustrated an example in which the characters (FIG. 36) are used as displayed information for main categories, and the decorative items (FIG. 38) are used as displayed information for sub categories. When a sub category under current setting is assumed to be "quiet", a main category is "healing type", referring to the category information storage section 32. At this time, the number of registered music pieces for the main category is 600, and the number of registered music pieces for the sub category is 200, in the example shown in FIG. 35. FIG. 40 shows one example of displayed information in which the displayed information for main categories shown in FIG. 36, and the displayed information for sub categories shown in FIG. 38 are combined under the above condition.

As the step S50 and the subsequent steps are similar to those of the first embodiment, the explanation will be omitted.

Application of changes in displayed information according to the above numbers of registered music pieces is not limited to application to both of sub categories and main categories, but also to that of either of them.

Moreover, combination with the music searching device 2 according to the second embodiment may be applied. Furthermore, combination with the music searching device 3 according to the third embodiment may be applied.

As described in detail above, the music playback device 4 according to the present embodiment has an advantage that a user can easily recognize his or her collection tendency and enjoy the music playback device for a long time without being tired, as the displayed information about a category changes based on the number of music pieces belonging the category.

Fifth Embodiment

A music playback device 5 according to a fifth embodiment of the present invention will be explained. The music playback device 5 according to the present embodiment may have a configuration in which image data are downloaded from an external server, and are set as displayed information for each of categories. Accordingly, the device 5 has a feature that displayed information is not fixed so that a user can maintain his or her interest in the music playback device longer and thus enjoy it more.

Figure 41:
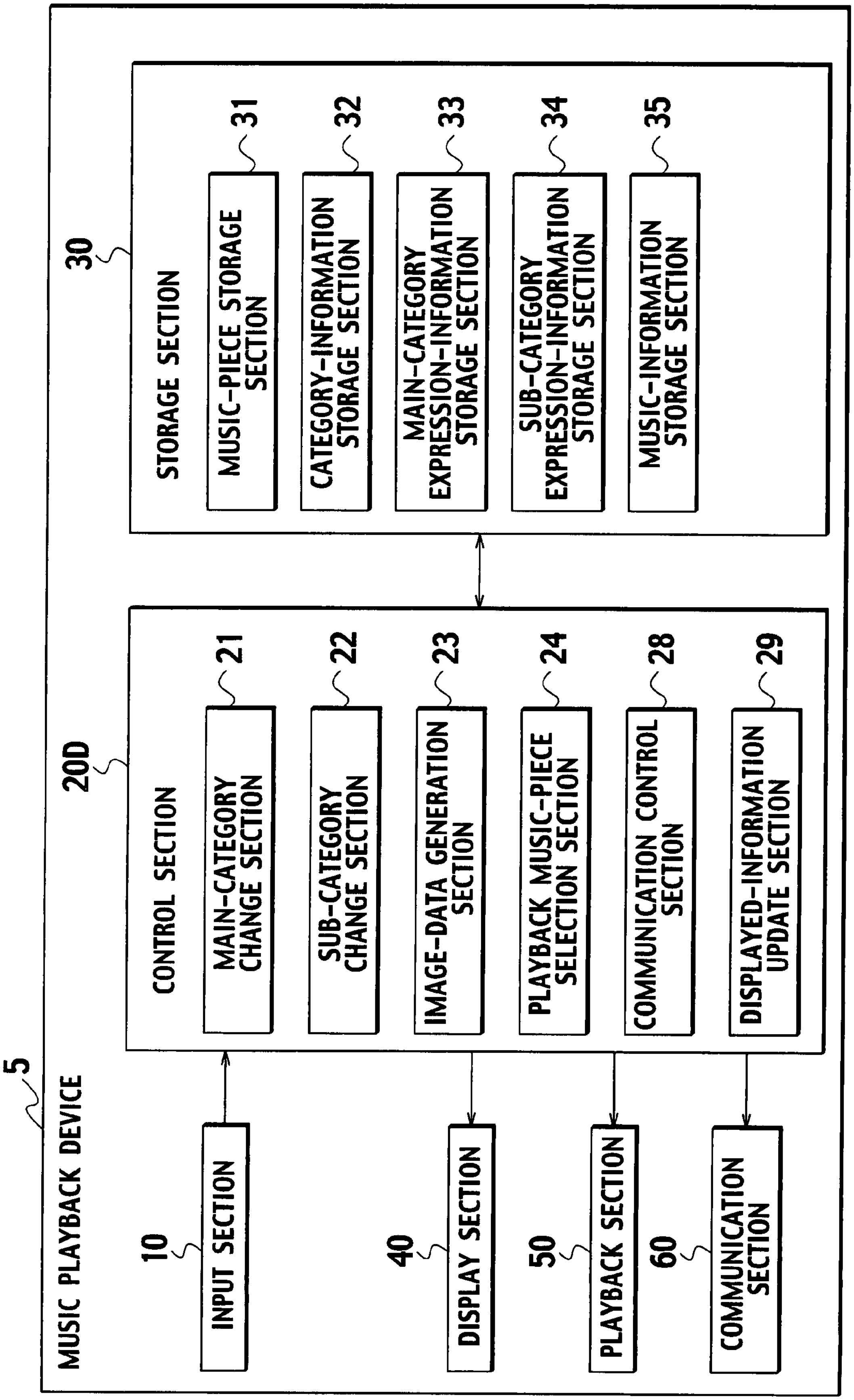
FIG. 41 is a block diagram of a music searching device according to a fifth embodiment of the present invention.

The configuration of the music playback device 5 according to the present embodiment will be explained, referring to FIG. 41. The music play back device 5 has a control section 20D, and the control section 20D is corresponding to the control section 20 in FIG. 1. But, the configuration of the section 20D is different from that of the section 20. The control section 20D in the music playback device 5 and the control section 20 in the music playback device 1 are different from each other in a point that a communication control section 28 and a displayed information update section 29 are newly added to the control section 20D in the music playback device 5. Moreover, a communication section 60 is newly added to the music playback device 5. In the present embodiment, the communication control section 28, the displayed information update section 29, and the communication section 60 will be explained, but explanation of other sections will be omitted, because the other sections are similar to those of the music playback device 1.

The communication control section 28 has a function for controlling transmission and reception of data to and from an external server. The transmission and reception of data to and from the external server are actually performed by the communication section 60, and the communication control section 28 conducts processing for creating data to be transmitted, and for interpretation of received data.

The displayed information update section 29 updates the main-category expression-information storage section 33 and the sub-category expression-information storage section 34 with the downloaded displayed information set.

The communication section 60 has a function for transmission and reception of digital data by network connection to the external server.

The music playback device 5 acquires a set of displayed information from the external server through the communication section 60. FIG. 42 is a view showing a system configuration representing a relation between the music playback device 5 and the server. The communication section 60 on the side of the music playback device 5 is connected to a communication section 560 on the side of a server 500 through a communication line 600. The communication line 600 is a network communication line such as a LAN cable and a wireless transmission line.

The server 500 has: a communication control section 510; a selection information conversion section 520; a displayed information acquisition section 530; and a displayed information storage section 540. The communication control section 510 has processing for interpretation of data received through the communication section 560, and for creating data to be transmitted.

The selection information conversion section 520 has a function for reading selection information from received data acquired by the communication control section 510, and for converting the selection information into a displayed information set ID.

The displayed information acquisition section 530 acquires displayed information from the displayed information storage section 540, based on the above displayed information set ID. The displayed information storage section 540 stores displayed information sets to be used for main categories and sub categories. Each displayed information set is stored in correspondence with each displayed information set ID. FIG. 43 shows the example of formatting displayed information storage section 540. FIG. 43 shows a state in which the displayed information set IDs and the displayed information sets are stored in the displayed information storage section 540 in each pair.

Figure 44:
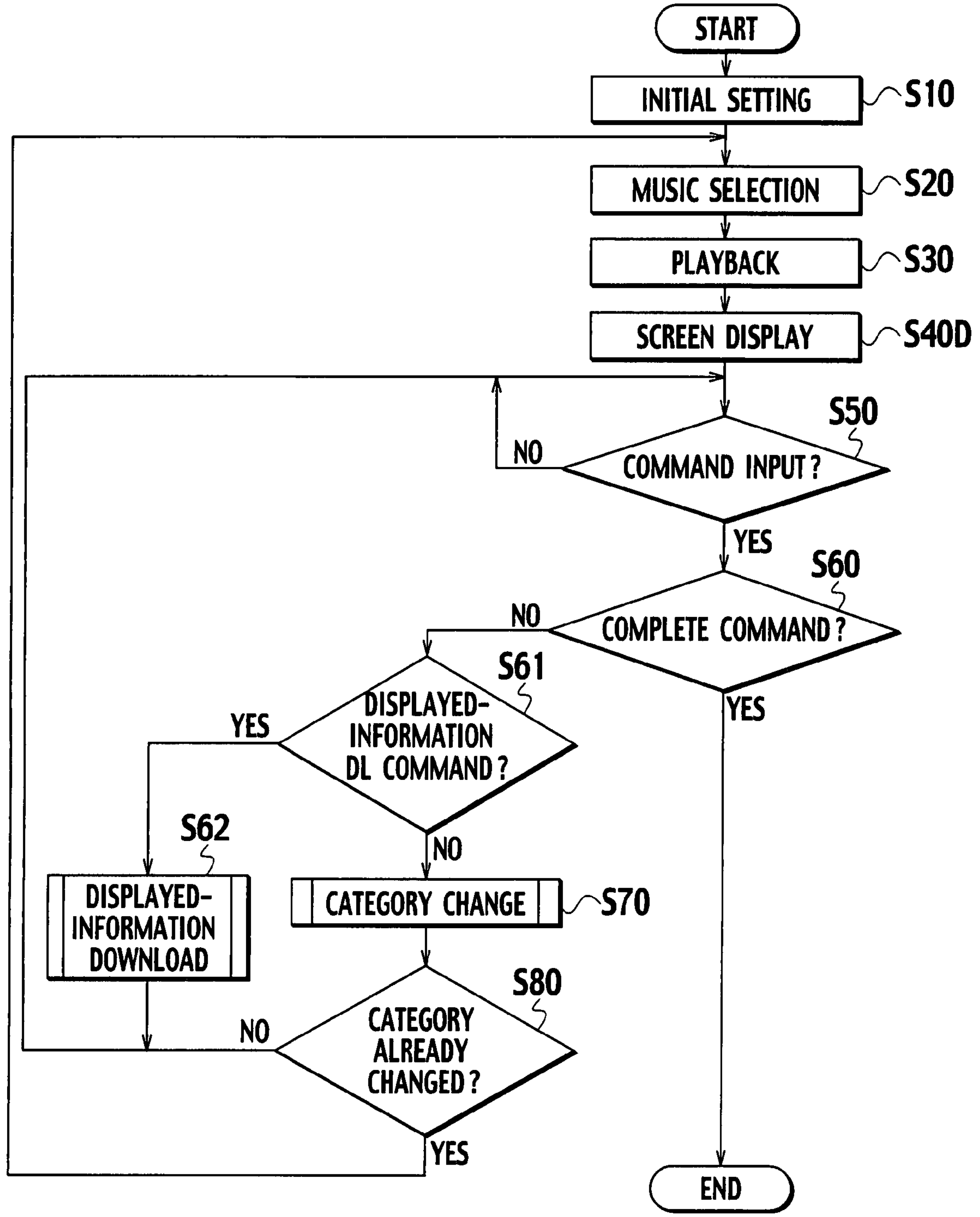
FIG. 44 is a flow chart explaining processing according to the fifth embodiment of the present invention.

Subsequently, operations of the music playback device 5 according to the present embodiment will be explained, referring to a flow chart shown in FIG. 44. In comparison with the operations of the music playback device 1 according to the first embodiment, the operations of the music playback device 5 according to the present embodiment includes newly added steps of determination processing (step S61), by which acquisition of a displayed information download command is confirmed, and displayed information download processing (step S62), and a step (step S40D) of screen display processing with different processing contents. Then, the determination whether a displayed information download command has been acquired, displayed information download processing, and a different point in the screen display processing between the embodiments will be explained in the present embodiment.

Figure 45:
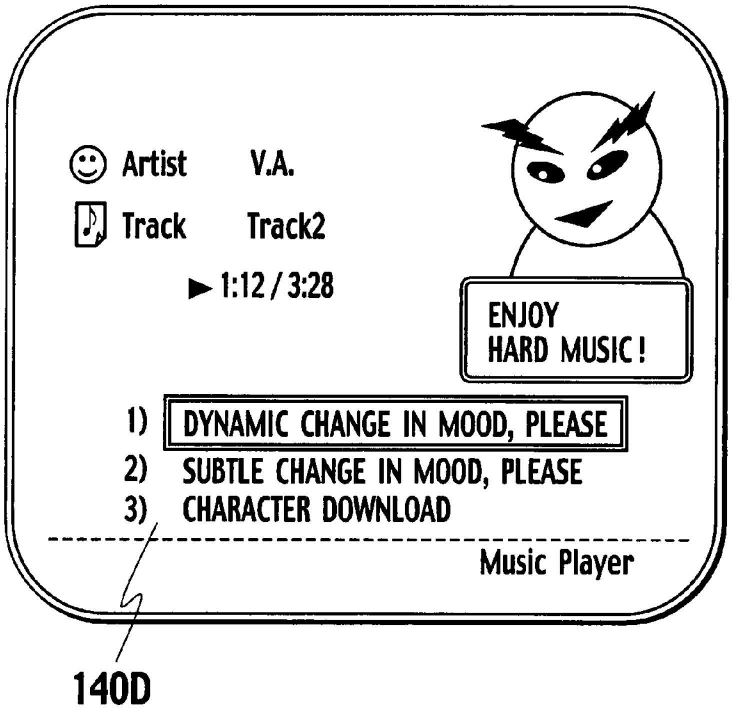
FIG. 45 is a view showing a state in which information and commands related with music pieces are displayed on a display section according to the fifth embodiment of the present invention.

In the screen display processing in the present embodiment, a command for new downloading of displayed information is displayed (step S40D), in addition to the screen display processing (step S40) in the first embodiment. FIG. 45 shows a state in which a displayed information download command "Character Download" is newly added to the example of the command list 140, shown in FIG. 17, for displayed information. For example, when a user inputs the above command, the music playback device 5 performs processing for download of a character for a new main category.

After the command is input by the user, it is determined whether the command is a displayed information download command (step S61). If the above command is the displayed information download command, the process proceeds to the displayed information download processing, and, if the above command is another command except the displayed information download command, the process proceeds to the category change processing.

Figure 46:
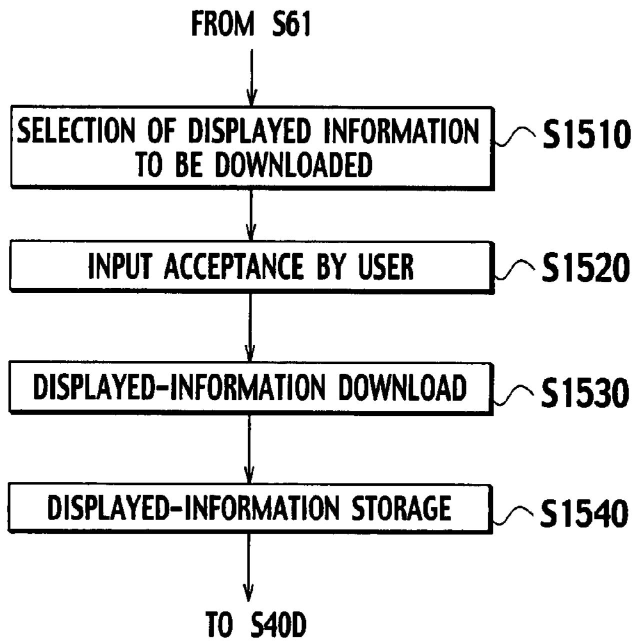
FIG. 46 is a flow chart showing details of processing for download of displayed information according to the fifth embodiment of the present invention.

When the displayed information download command is acquired, the process in the control section 20D advances to the displayed information download processing (step S62). Details of the displayed information download processing will be explained, using a flow chart shown in FIG. 46.

In the first place, processing for selection of displayed information to be downloaded is performed (step S1510). Specifically, the communication control section 28 accesses the server 500 through the communication section 60 to acquire the displayed information list for downloading. Subsequently, the communication control section 28 displays the acquired data on the display section 40.

Figure 47:
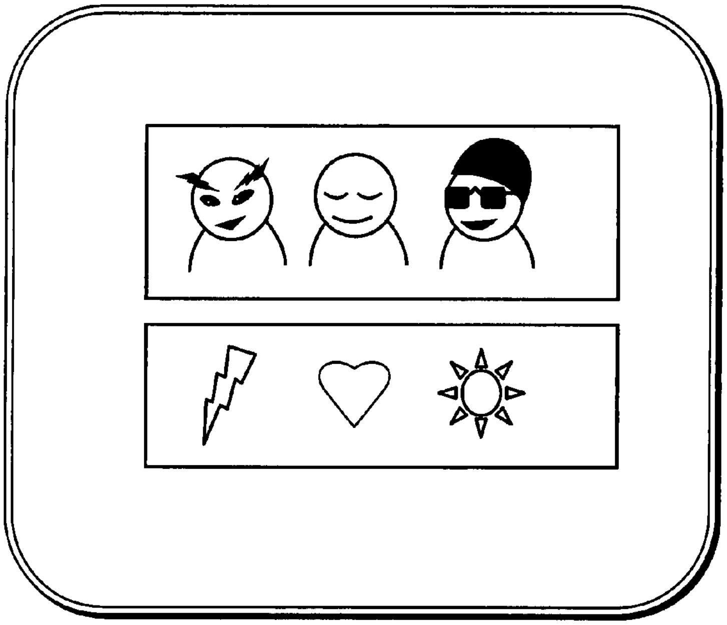
FIG. 47 is a view showing an example in which characters stored in a displayed information storage section of a server according to the fifth embodiment of the present invention are displayed as a thumbnail display.
Figure 48:
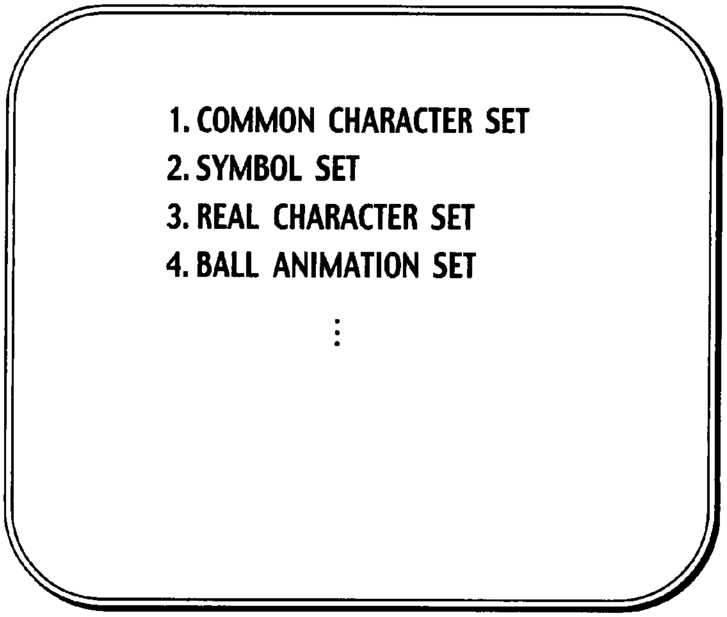
FIG. 48 is a view showing an example in which characters stored in the displayed information storage section of the server according to the fifth embodiment of the present invention are expressed in letters.

When the displayed information is image information, it is acceptable to use thumbnail display, or letter display for the displayed information displayed as a list. FIG. 47 is a view showing an example in which character information for main categories is displayed as a thumbnail display. On the upper side of FIG. 47, a displayed information set for expressing main categories is displayed, using human-shaped characters, while on the lower side of FIG. 47, a displayed information set for expressing main categories is displayed, using abstract symbols. In FIG. 48, downloadable displayed information for main categories is displayed, using letters.

Then, the control section 20D accepts (step S1520) selection of displayed information to be downloaded from the list display. The control section 20D switches a selected item according to input information from the input section 10, and when input with a decision button is accepted, an item under current selection is decided as displayed information to be downloaded.

Figure 49:
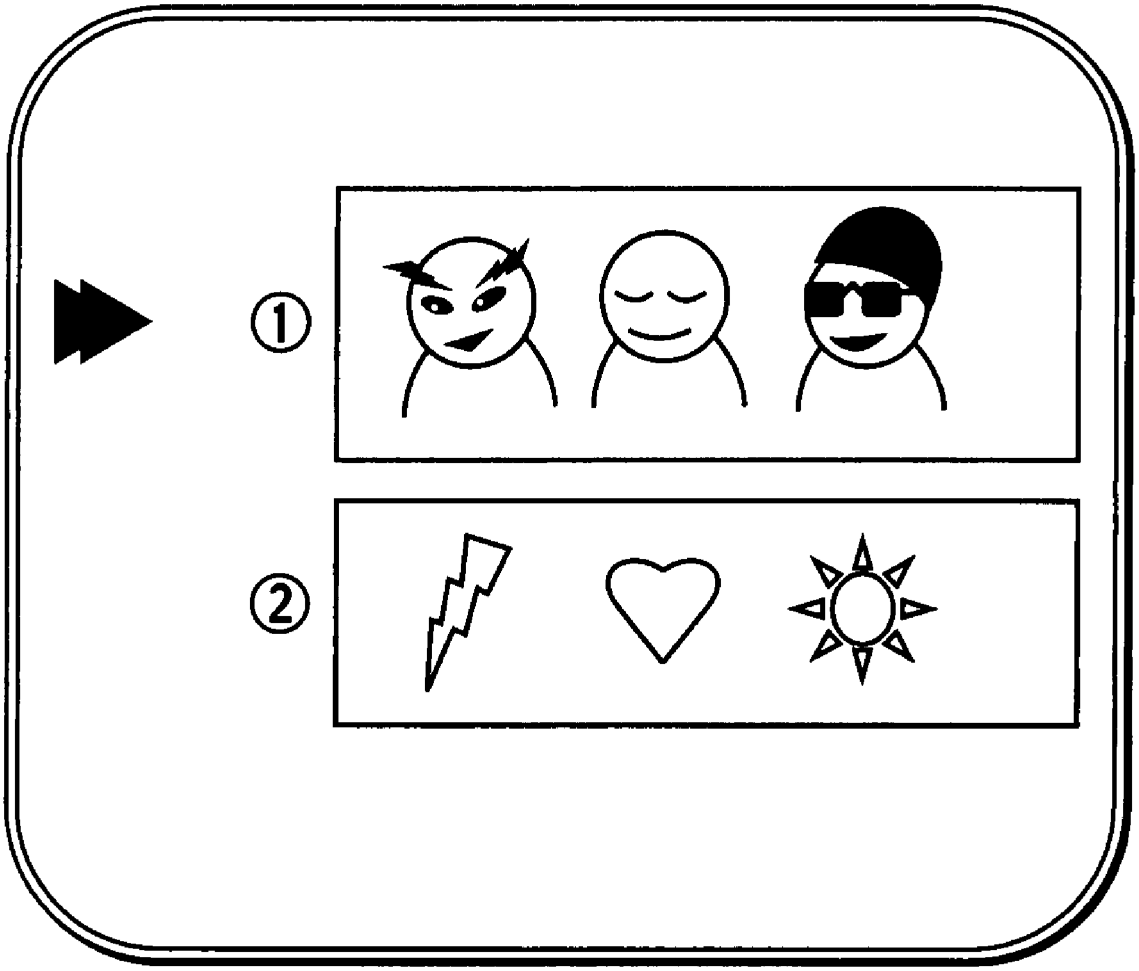
FIG. 49 is a view showing a screen for selection of displayed information to be downloaded according to the fifth embodiment of the present invention.

In the example shown in, for example, FIG. 49, a cursor shown in the left end portion is moved by using a cursor move button 11 (FIG. 2A) to switch displayed information to be selected, and a decision button 12 (FIG. 2A) is pushed downward to download displayed information under selection. Moreover, it is acceptable to directly decide displayed information to be downloaded by pushing a direct input button 13 (FIG. 2B) down, wherein the direct input button 13 is corresponding to numbers shown in FIG. 49.

Subsequently, the communication control section 28 accesses the server 500 for processing by which displayed information is downloaded (step S1530). The communication control section 28 transmits information on which displayed information set is selected at the previous step S1520, to the server 500 through the communication section 60, and acquires a displayed information set related with the above information transmitted from the server 500.

Processing on the side of the server at the step S1530 will be described in the following: On the side of the server 500, the communication control section 510 receives data from the communication section 60 in the first place, and converts the received data into a selection information. Subsequently, the selection information conversion section 520 converts the above selection information into a displayed information set ID, and sends the information to the displayed information acquisition section 520. The conversion from selection information to a displayed information set ID is based on a table held in the inside of the selection information conversion section 520. Then, the displayed information acquisition section 530 searches the displayed information storage section 540, based on the above displayed information ID, to acquire displayed information corresponding thereto. Subsequently, the displayed information acquisition section 530 sends the above acquired displayed information to the communication control section 510. Finally, the communication control section 510 transmits the above displayed information to the music playback device 5 through the communication section 60. The above description has been made for processing on the side of the server at the step S1530.

After downloading of the displayed information, the displayed information reset section 29 stores the displayed information in the storage section 30D (step S1540). In the first place, the communication control section 28 sends the displayed information received through the communication section 60 to the displayed information reset section 29. Then, the displayed information reset section 29 stores the above displayed information in the main-category expression-information storage section 33 when the above displayed information is displayed information for main categories, and stores the above displayed information in the sub-category expression-information storage section 34 when the above displayed information is displayed information for sub categories.

The music searching device 5 according to the present embodiment may be combined with the music searching device 2 according to the second embodiment, the music searching device 3 according to the third embodiment, and the music searching device 4 according to the fourth embodiment.

Here, it is acceptable to realize the functions of the above devices by programs through which a computer executes the above functions. It is acceptable to read the above programs from recording mediums for loading into the computer, or to transmit the programs through a communication network to the computer for loading into the computer.

As described in detail above, the music playback device 5 according to the present embodiment has an advantage that displayed information is not fixed so that a user can maintain his or her interest in the music playback device longer and thus enjoy it more.

It should be understood that many modifications and adaptations of the invention will become apparent to those skilled in the art and it is intended to encompass such obvious modifications and changes in the scope of the claims appended hereto.

What is claimed is:

1. A music playback device which selects one piece of music data from a first storage section storing music data for each of a plurality of music pieces, and plays the selected piece of music data in a playback section, comprising:

a second storage section storing first corresponding information about a correspondence between one of a plurality of sub categories, selected as information of music classification about the plurality of music pieces, and each piece of music data for each music piece;

a third storage section storing second corresponding information about a correspondence between each of a plurality of main categories used as a high level category of the sub categories and one or more different sub categories;

a fourth storage section storing main category displayed information for generating pieces of image data different for each main category, the image data being characteristic image data which expresses representation of each main category, the pieces of image data being displayed on a display section;

a change section setting one sub category from among the plurality of sub categories as an initial value, setting a main category corresponding to the set sub category as an initial value by referring to the second corresponding information stored in the third storage section, and when an instruction signal for changing the main category is supplied from outside, selecting and setting one main category except a main category that is currently set as a new main category, selecting and setting one sub category corresponding to the newly set main category as a new sub category with referring to the second corresponding information;

a selection section reading one piece of music data corresponding to the sub category set newly in the change section from the first storage section with referring to the first corresponding information stored in the second storage section, and allowing the playback section to play back the read piece of music data;

a generation section reading the main category displayed information corresponding to the main category set newly in the change section from the fourth storage section and generating image data according to the read main category displayed information; and a fifth storage section storing sub category displayed information for generating pieces of image data different for each sub category, the image data being a decorative item decorating the characteristic image of the main category, the decorative item expressing representation of each sub category, the pieces of image data being displayed on the display section, wherein the generation section further reads the sub category displayed information corresponding to the sub category set newly in the change section from the fifth storage section, and generates image data according to the read sub category displayed information.

2. The music playback device as claimed in claim 1, further comprising:

a creation section acquiring all pieces of main category displayed information about the plurality of main categories from the fourth storage section and allowing the display section to display the acquired main category displayed information as list information, wherein the change section, when a main category selection signal representing a main category selected from among the list information is supplied, sets the selected main category as a new main category, and selects and sets one sub category corresponding to the newly set main category as a new sub category with referring to the second corresponding information stored in the third storage section.

3. The music playback device as claimed in claim 1, further comprising:

a fifth storage section storing numbers of playback times of music pieces, which are played in the playback section, for respective main categories, wherein the fourth storage section stores a plurality of pieces of main category displayed information decided according to the number of playback times for each main category, and the generation section reads the number of playback times from the fifth storage section, reads main category displayed information corresponding to the main category set newly in the change section and corresponding to the number of playback times read from the fourth storage section, and generates image data according to the read main category displayed information.

4. The music playback device as claimed in claim 1, wherein the third storage section stores the second corresponding information about the correspondence between each of the plurality of main categories used as the high level category of the sub categories and the one or more sub categories, and stores the numbers of registered pieces of music data, which is stored in the first storage section, for respective main categories, the fourth storage section stores a plurality of pieces of main category displayed information decided according to the number of registered pieces for each main category, and the generation section reads the number of registered pieces corresponding to the main category set newly in the change section from the third storage section, reads main category displayed information corresponding to the main category set newly in the change section and corresponding to the number of registered pieces read from the fourth storage section, and generates the image data according to the read main category displayed information.

5. The music playback device as claimed in claim 1, further comprising:

a sixth storage section storing numbers of playback times of music pieces, which are played in the playback section, for respective sub categories, wherein the fifth storage section stores a plurality of pieces of sub category displayed information decided according to the number of playback times for each sub category, and the generation section reads the main category displayed information corresponding to the main category set newly in the change section from the fourth storage section, and reads the sub category displayed information corresponding to the sub category set newly in the change section and corresponding to the number of playback times read from the sixth storage section, from the fifth storage section, and generates the image data according to the read main category displayed information and the read sub category displayed information.

6. The music playback device as claimed in claim 1, wherein the third storage section stores the second corresponding information about the correspondence between each of the plurality of main categories used as the high level category of the sub categories and the one or more sub categories, and stores the numbers of registered pieces of music data, which is stored in the first storage section, for respective sub categories, the fifth storage section stores a plurality of pieces of sub category displayed information decided according to the number of registered pieces for each sub category, and the generation section reads the number of registered pieces corresponding to the sub category set newly in the change section from the third storage section, reads main category displayed information corresponding to the main category set newly in the change section from the fourth storage section, reads sub category displayed information corresponding to the sub category set newly in the change section and corresponding to the number of registered pieces read from the fourth storage section, and generates the image data according to the read main category displayed information and the read sub category displayed information.

7. The music playback device as claimed in claim 1, wherein the change section refers to the second corresponding information stored in the third storage section, and selects and sets one sub category except a sub category that is currently set, from among the plurality of sub categories corresponding to a main category that is currently set, when an instruction signal for changing a sub category is supplied from the outside.

8. The music playback device as claimed in claim 1, wherein the fourth storage section stores main category displayed information for generating pieces of image data different for each main category, the image data being first animation data which expresses representation of each main category, the pieces of image data being displayed on a display section, and the fifth storage section stores sub category displayed information for generating pieces of image data different for each sub category, the image data being second animation data which expresses representation of each sub category, the second animation data being added to the first animation data, the pieces of image data being displayed on the display section.

9. A music playback method by which one piece of music data is selected from a first storage section storing music data for each of a plurality of music pieces, and the selected piece of music data is played back, comprising:

setting one sub category as an initial value from among a plurality of sub categories, selected as information of music classification about the plurality of music pieces;

setting a main category corresponding to the set sub category as an initial value by referring to second corresponding information stored in a third storage section storing the second corresponding information about a correspondence between each of a plurality of main categories used as a high level category of the sub categories and one or more different sub categories;

selecting and reading one piece of music data corresponding to the set sub category from the first storage section by referring to first corresponding information stored in a second storage section storing the first corresponding information about a correspondence between one of the plurality of sub categories and each piece of music data for each music piece, and playing back the read piece of music data;

reading main category displayed information corresponding to the set main category from a fourth storage section storing the main category displayed information for generating pieces of image data different for each main category, the image data being characteristic image which expresses representation of each main category, the pieces of image data being displayed on a display section, and generating characteristic image according to the read main category displayed information;

waiting for a signal to be supplied from outside;

selecting and setting one main category except a main category that is currently set as a new main category, and selecting and setting one sub category corresponding to the newly set main category as a new sub category with referring to the second corresponding information when an instruction signal for changing the main category is supplied from the outside;

returning to the step of selecting and reading one piece of music data, and reselecting one piece of music data for play back corresponding to the newly set sub category and regenerating the image data based on the newly set main category;

reading sub category displayed information corresponding to the newly set sub category from a fifth storage section storing the sub category displayed information for generating pieces of image data different for each sub category, the image data being decorative item decorating the characteristic image of the main category, the decorative item expressing representation of each sub category, the pieces of image data being displayed on the display section; and generating the decorative item according to the read sub category displayed information, in addition to generating the characteristic image according to the displayed information corresponding to the newly set main category.

10. The music playback method as claimed in claim 9, further comprising:

acquiring all pieces of main category displayed information about the plurality of main categories from the fourth storage section and allowing the display section to display the acquired main category displayed information as list information, when a main category selection signal representing a main category selected from among the list information is supplied from the outside; and setting the selected main category as a new main category, and selecting and setting one sub category corresponding to the newly set main category as a new sub category with referring to the second corresponding information stored in the third storage section.

11. The music playback method as claimed in claim 9, wherein the fourth storage section stores a plurality of pieces of main category displayed information decided according to the number of playback times for each main category, the method further comprises a step of updating the number of playback times of a main category corresponding to the played music piece when the selected piece of music data is played back, the number of playback times being recorded in a fifth storage section storing the numbers of playback times of played music pieces for respective main categories, and in the step of generating the image data according to the main category displayed information corresponding to the set main category, the number of playback times is read from the fifth storage section, and main category displayed information corresponding to the set main category and corresponding to the read number of playback times is read from the fourth storage section to generate the image data according to the read main category displayed information.

12. The music playback method as claimed in claim 9, wherein the third storage section stores the second corresponding information about the correspondence between each of the plurality of main categories used as the high level category of the sub categories and the one or more sub categories, and stores the numbers of registered pieces of music data, which is stored in the first storage section, for respective main categories, and the fourth storage section stores a plurality of pieces of main category displayed information decided according to the number of registered pieces for each main category, and in the step of generating the image data according to the displayed information corresponding to the set main category, the number of registered pieces corresponding to the set main category is read from the third storage section, and main category displayed information corresponding to the set main category and corresponding to the read number of registered pieces is read from the fourth storage section, and the image data is generated according to the read main category displayed information.

13. The music playback method as claimed in claim 9, wherein the fifth storage section stores a plurality of pieces of sub category displayed information decided according to the number of playback times for each sub category, and in the step of generating the image data according to the displayed information corresponding to the set main category and the set sub category, the main category displayed information corresponding to the set main category is read from the fourth storage section, and the sub category displayed information corresponding to the set sub category and corresponding to a number of playback times read from a sixth storage section storing numbers of playback times of played music pieces for respective sub categories is read from the fifth storage section to generate the image data according to the read main category displayed information and the read sub category displayed information.

14. The music playback method as claimed in claim 9, wherein the third storage section stores the second corresponding information about the correspondence between each of the plurality of main categories used as the high level category of the sub categories and the one or more subcategories, and stores the numbers of registered pieces of music data, which is stored in the first storage section, for respective sub categories, and the fifth storage section stores a plurality of pieces of sub category displayed information decided according to the number of registered pieces for each sub category, and in the step of generating the image data according to the displayed information corresponding to the set main category and the set sub category, the number of registered pieces corresponding to the set sub category is read from the third storage section, main category displayed information corresponding to the set main category is read from the fourth storage section, sub category displayed information corresponding to the set sub category and corresponding to the read number of registered pieces is read from the fifth storage section, and the image data is generated according to the read main category displayed information and the read sub category displayed information.

15. The music playback method as claimed in claim 9, further comprising:

referring to the second corresponding information stored in the third storage section, and selecting and setting one sub category except a sub category that is currently set, from among the plurality of sub categories corresponding to a main category that is currently set, when an instruction signal for changing a sub category is supplied from the outside.

16. The music playback method as claimed in claim 9, wherein reading main category displayed information corresponding to the set main category from a fourth storage section storing the main category displayed information for generating pieces of image data different for each main category, the image data being first animation data which expresses representation of each main category, the pieces of image data being displayed on a display section, and generating first animation data according to the read main category displayed information;

reading sub category displayed information corresponding to the newly set sub category from a fifth storage section storing the sub category displayed information for generating pieces of image data different for each sub category, the image data being the decorative item decorating the characteristic image of the main category, second animation data which expresses representation of each sub category, the second animation data being added to the first animation data, the pieces of image data being displayed on the display section; and generating the second animation data according to the read sub category displayed information, in addition to generating the first animation data according to the displayed information corresponding to the newly set main category.

* * * * *